United States Patent
Khlat et al.

(10) Patent No.: US 9,196,945 B2
(45) Date of Patent: Nov. 24, 2015

(54) VSWR TOLERANT TUNABLE HYBRID DUPLEXER

(71) Applicant: RF Micro Devices, Inc., Greensboro, NC (US)

(72) Inventors: Nadim Khlat, Cugnaux (FR); Marcus Granger-Jones, Scotts Valley, CA (US); Ruediger Bauder, Feldkirchen-Westerham (DE)

(73) Assignee: RF Micro Devices, Inc., Greensboro, NC (US)

( * ) Notice: Subject to any disclaimer, the term of this patent is extended or adjusted under 35 U.S.C. 154(b) by 211 days.

(21) Appl. No.: 13/904,520

(22) Filed: May 29, 2013

(65) Prior Publication Data

US 2013/0321097 A1    Dec. 5, 2013

Related U.S. Application Data

(60) Provisional application No. 61/652,383, filed on May 29, 2012.

(51) Int. Cl.
*H01P 5/12* (2006.01)
*H04B 1/00* (2006.01)
*H03H 7/18* (2006.01)

(52) U.S. Cl.
CPC ............... *H01P 5/12* (2013.01); *H04B 1/0057* (2013.01)

(58) Field of Classification Search
CPC .................................. H01P 5/12; H03H 7/16
USPC .................. 333/109–112, 117, 118, 129, 139
See application file for complete search history.

(56) References Cited

U.S. PATENT DOCUMENTS

| | | | |
|---|---|---|---|
| 6,748,197 B2* | 6/2004 | Lindemann et al. | 455/82 |
| 6,882,244 B2* | 4/2005 | Stenberg | 333/117 |
| 7,123,883 B2* | 10/2006 | Mages | 455/78 |
| 7,941,187 B2* | 5/2011 | Kim et al. | 455/561 |
| 8,022,787 B2* | 9/2011 | Inoue et al. | 333/110 |
| 9,042,275 B2* | 5/2015 | Bauder et al. | 370/277 |
| 9,048,805 B2* | 6/2015 | Granger-Jones et al. | 1/1 |
| 2007/0015468 A1* | 1/2007 | Kouki et al. | 455/63.1 |
| 2013/0201882 A1* | 8/2013 | Bauder et al. | 370/277 |
| 2014/0159818 A1* | 6/2014 | Jeon et al. | 330/295 |

* cited by examiner

*Primary Examiner* — Dean Takaoka
(74) *Attorney, Agent, or Firm* — Withrow & Terranova, P.L.L.C.

(57) ABSTRACT

The disclosure describes a dual hybrid duplexer including two hybrid couplers, two intra-filters, a tunable isolation load, and a phase shifter. The phase shifter may be located at the isolation port. The phase shifter may be located at the antenna port. In one embodiment, a dual hybrid duplexer includes two hybrid couplers, two intra-filters, a tunable isolation load, a first phase shifter located at the isolation port, and a second phase shifter located at the antenna port. The first and second phase shifters have a difference of 90 degrees (plus or minus 10 degrees).

22 Claims, 27 Drawing Sheets

DUAL HYBRID TUNABLE DUPLEXER

ISOLATION OF RECEIVER PORT

ISOLATION OF OUT OF BAND REJECTIONS

SECOND DUAL HYBRID TUNABLE DUPLEXER

REFLECT AND TUNE THE TRANSMISSION SIGNAL

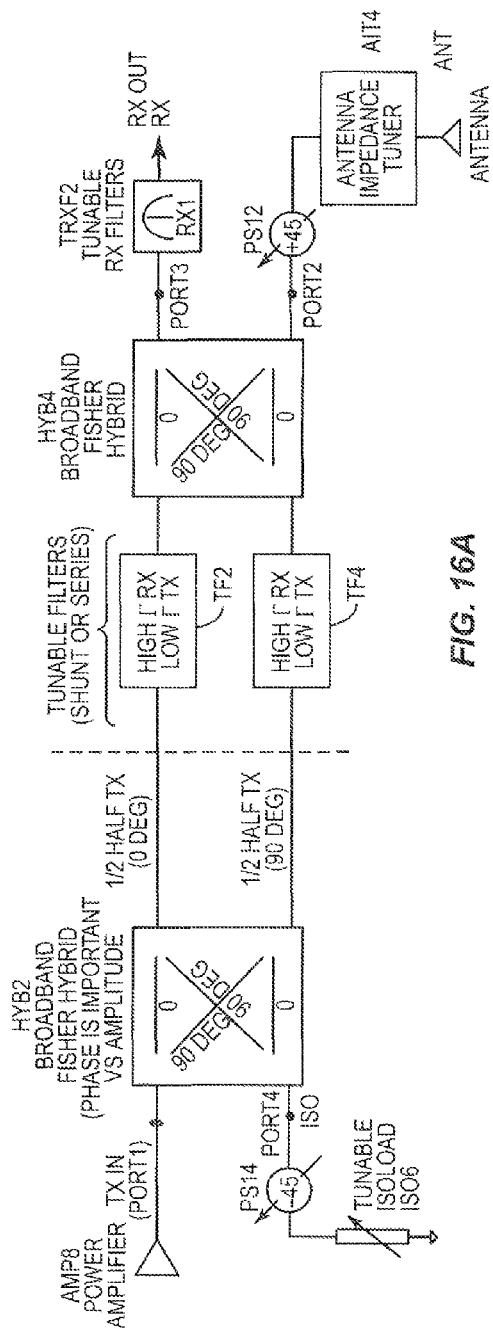
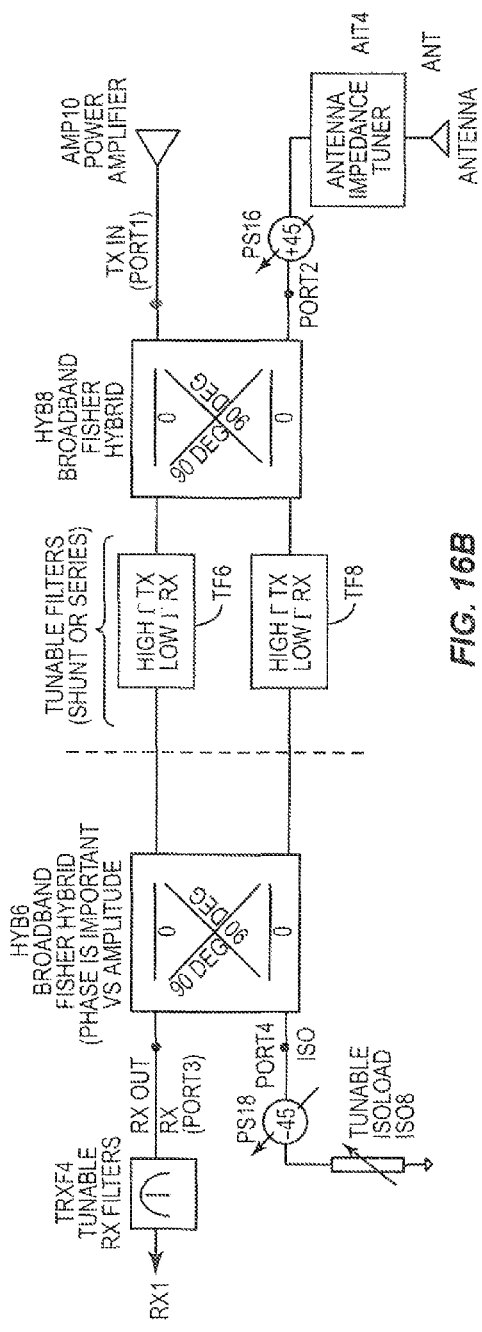
FIG. 16A
FIG. 16B

VSWR TOLERANT TUNABLE HYBRID DUPLEXER

RELATED APPLICATIONS

This application claims the benefit of provisional patent application Ser. No. 61/652,383, filed May 29, 2012, the disclosure of which is hereby incorporated herein by reference in its entirety.

FIELD OF THE DISCLOSURE

This disclosure is in the field of tunable duplexer architecture for multiband communications. Specifically, conventional switches and duplexers may be replaced by tunable duplexers including 90 degree hybrid couplers or including quadrature couplers.

BACKGROUND

FIG. 1. Conventional radio cellular systems include many switches and many individual (non-tunable) duplexers. FIG. 1 illustrates a conventional multi-band system with amplifiers, band switches, duplexers, an antenna T/R (Transmit Receive) switch, and an antenna.

In conventional radio cellular systems that operate in multi-modes and multi-bands (such as 3G, 4G, and/or 5G systems), there are many duplexer related components. These components include T/R (transmit/receive) switches such as PA (power amplifier) band switches and antenna band switches. These components are growing in numbers and undesirably increasing the total solution cost and size.

Specifically, FIG. 1 illustrates a conventional system including: amplifiers (AMP 2 and AMP4); band switches (SW2 and SW4); duplexers module (DMOD) including duplexers (D17, D8, D5, D13, D2, D1, and D4); an antenna T/R (Transmit/Receive) switch SW6; and a main antenna ANT. For the sake of clarity and conciseness, many other elements (such as a diversity antenna and related circuitry) are not shown in FIG. 1. Also, the wiring for received signals exiting the duplexer is not shown.

Beginning with low band elements, low-band amplifier AMP2 receives a voltage VA2IN and then outputs an amplified voltage VA2OUT. Low-band switch SW2 receives VA2OUT, and selectively outputs one of: V17, V8, V5, and V13.

High-band amplifier AMP4 receives a voltage VA4IN and outputs an amplified voltage VA4OUT. High-band switch SW4 receives VA4OUT and then selectively outputs one of: V2, V1, and V4.

In a transmit mode, duplexers module DMOD receives a selected voltage (V17, V8, V5, V13, V2, V1, or V4), processes the selected voltage through a corresponding duplexer (D17, D8, D5, D13, D2, D1, or D4 respectively), and outputs a duplexed voltage (VD17, VD8, VD5, VD13, VD2, VD1, or VD4 respectively).

Remaining in transmit mode, antenna T/R (transmit/receive) switch SW6 receives one or more duplexed voltages (VD17, VD8, VD5, VD13, VD2, VD1, or VD4), selects one of these received duplexed voltages, and outputs the selected voltage as VANT to main antenna ANT.

In a receive mode, signals flow from right to left. Main antenna ANT receives a signal as VANT, antenna T/R switch selectively outputs VANT as one of VD17, VD8, VD5, VD13, VD2, VD1, or VD4 towards a corresponding duplexer (D17, D8, D5, D13, D2, D1, or D4 respectively). For example, if duplexer D17 is selected, then the received signal VANT is transmitted through antenna T/R switch SW6 and then towards duplexer D17 as VD17. Duplexer D17 receives the received signal VD17, and then outputs a duplexed received signal (not shown). The duplexer generally performs filtering that is specific for the band in which the duplexer is operating.

FIG. 2(a). FIG. 2(a) is a conventional dual hybrid tunable duplexer with intra-filters that reflect RX signals and pass TX signals, illustrating the paths from a power amplifier to an antenna. The hybrid structures in FIG. 2(a) are 90 degree hybrid structures with a −3 dB power split on the quadrature ports. These hybrids are also known as 90 degree Hybrid couplers or Quadrature Couplers.

Specifically, FIG. 2(a) illustrates power amplifier AMP6 outputting signal V20 for transmission. Hybrid HYB2 receives signal V20 and splits this signal into two "half power" signals: V22 exiting the top right with no phase shift (an "in-phase output"), and V23 exiting the bottom right with 90 degree phase shift (a "quadrature component"). Thus, hybrid HYB2 simultaneously provides a 3 dB power split into two signals (half power to the upper right, and half power to the lower right), and a 90 degree phase shift to one of the signals (to the lower right).

Tunable filter TF2 receives V22 (the upper signal, or "in-phase output"), and transmits almost all of this signal as V24 (due to low reflectivity $\Gamma$ in the TX band, and high reflectivity $\Gamma$ outside of the TX band). For example, Tunable filter TF2 may be a band pass filter centered at the transmit frequency.

Tunable filter TF4 receives V23, and transmits almost all of this signal as V25 (due to low reflectivity $\Gamma$ in the TX band). In one embodiment, tunable filters TF2 and TF4 are identical.

Hybrid HYB4 receives V24, shifts it 90 degrees, and send it out the antenna port Port2 to the antenna ANT. Additionally, HYB4 receives V25, and sends it out Port2 without any additional shifting. Now, these two half power signals have each been shifted 90 degrees, and they will add (not cancel) at Port2. Thus, the antenna ANT receives combined signal VANT substantially equivalent to the entire V20 shifted 90 degrees, and with out of band portions of the signal having been filtered or reflected (high $\Gamma$ RX) out.

In summary, HYB2 splits the TX signal into two halves, while shifting the lower half by 90 degrees. The second hybrid HYB4 combines the split signals, while shifting the upper half by 90 degrees. Overall, the antenna ANT receives combined signal VANT that is substantially equivalent to the entire V20 shifted 90 degrees. Additionally, tunable RX filter TRXF2 and isolator ISO2 are discussed below.

During transmission, hybrid or "quadrature" coupler HYB4 typically provides 20 to 30 dB of isolation between receiving RX port 3 and transmitting antenna port 2.

FIG. 2(b). FIG. 2(b) illustrates isolation at the receiver port caused by the second hybrid coupler. Specifically, as discussed above, hybrid HYB4 receives signal V24 (a half power, un-shifted, filtered, transmission signal). V24 is transmitted directly to V26 without any additional shifting.

Additionally, hybrid HYB4 receives signal V25 (a half power, 90 degree shifted, filtered transmission signal). V25 is transmitted to V26 with an additional 90 degree shift, creating a half power, 180 degree shifted, filtered transmission signal. Thus, V26 combines a half powered, un-shifted, filtered transmission signal with a half power, 180 degree shifted, filtered transmission signal, and these two signals ideally cancel out because they are equivalent in magnitude but 180 degrees out of phase. Thus, V26 is near zero, illustrating very high isolation between the transmitted output VANT and any signal leaking out as V26. In practice, these combined signals do not perfectly cancel (due to mismatching), but they do provide approximately 20 dB to 30 dB of cancellation (20 to 30 dB lower power than the transmission signal VANT).

FIG. 2(c). FIG. 2(c) illustrates reflections from the tunable filters directed towards the isolation port. Tunable filter TF2 reflects (leftward) any out of band portions of the received half power un-shifted transmission signal V22 (due to high Γ RX). Hybrid HYB2 shifts this upper reflected signal by 90 degrees and sends the shifted reflected signal (downward and to the left) to the isolation port Port4.

Tunable filter TF4 reflects (leftward) any out of band portions of the received half power 90 degree shifted transmission signal V23 (due to high Γ RX). Hybrid HYB2 does not shift this lower reflected signal any more, while sending this reflected signal (to the left) to the isolation port Port4.

Isolation port resistor ISO4 absorbs both of these (out of band, undesired) reflected signals, in order to avoid these reflected signals being problematically reflected back into the hybrids.

FIG. 2(d). FIG. 2(d) illustrates receiving an un-tuned signal. An un-tuned signal RX is received at antenna ANT, and accepted by hybrid HYB4 at Port2. A half power 90 degree shifted un-tuned signal RX is output (upper left) towards filter TF2. Simultaneously, a half power un-shifted un-tuned signal RX is output (lower left) towards filter TF4.

FIG. 2(e). FIG. 2(e) illustrates reflecting and tuning the received signal. Filter TF2 reflects the half power, 90 degree shifted un-tuned signal RX to the upper left of hybrid HYB4. HYB4 passes this signal (without additional shifting) towards tunable RX filter TRXF2.

Further, filter TF4 reflects the half power, un-shifted, un-tuned signal RX to the lower left of hybrid HYB4. Hybrid HYB4 passes this signal (while adding a 90 degrees shift) towards tunable RX filter TRXF2.

Exiting the top right of hybrid HYB4, these two half power signals (now each shifted 90 degrees) are combined into a whole power signal shifted 90 degrees V26. Tunable filter TRXF2 may be tuned to a specific band, and thus may pass VRXOUT in a selected specific band, while filtering out portions of the received signal that are in other bands.

FIG. 3(a). FIG. 3(a) is a second type of conventional dual hybrid tunable duplexer, with intra-filters that pass RX signals and reflect TX signals, illustrating the paths from a power amplifier to the intra-filters.

Specifically, FIG. 3(a) is a different configuration of the same elements shown in FIG. 2(a), except that the intra-filters (the tunable filters located between the hybrids) now pass (instead of reflect) RX signals, and reflect (instead of pass) TX signals. Power amplifier AMP8 sends a transmission signal TX to Port1 of hybrid HYB8. Hybrid HYB8 sends a half-power, un-shifted TX signal to tunable filter TF6, and sends a half-power, 90 degree shifted TX signal to tunable filter TF8. In one embodiment, tunable filters TF6 and TF8 are identical.

FIG. 3(b). FIG. 3(b) reflects transmission signals by the "intra-filters" located between the hybrids. The split signals from the previous figure are each reflected. Specifically, the half power, un-shifted signal is reflected by tunable filter TF6 (due to high Γ TX). Any out of band portions of this signal are passed by the tunable filter. In other words, the reflected signal has been filtered to be in a selected transmission band. Hybrid HYB8 receives this reflected signal at the upper left, and sends it towards the antenna while shifting 90 degrees (resulting in a half power, 90 degree shifted, filtered signal at Port2).

Tunable filter TF8 receives a half-power, 90 degree shifted, unfiltered signal from hybrid HYB8, and reflects a filtered portion of this signal back towards hybrid HYB8 (due to high Γ TX). Hybrid HYB8 passes (receives at the lower left port and sends out the lower right port of the hybrid) this reflected signal (without any additional phase shift) towards the antenna ANT at Port2.

These two half-power, 90 degree shifted, filtered signals are combined at Port2 to create a full-power, 90 degree shifted, filtered signal TXOUT.

FIG. 3(c). FIG. 3(c) illustrates that the RX noise is cancelled. Tunable filters TF6 and TF8 passes (low Γ RX) portions of TXIN that are outside of a selected TX band. These transmitted noise signals pass through hybrid HYB6. The lower noise signal is shifted 90 degrees (for a second time) by HYB6, resulting in 180 degree shifted signal exiting at Port3. The upper signal is passed by HYB6 without any shifting to Port3. These two noise signals effectively cancel at Port3 (RXOUT equals about zero) because one of the noise signals has been shifted 180 degrees, and the other has not been shifted.

Somewhat similar to the above discussion of FIGS. 2(a)-(e), FIGS. 3(a)-(c) provide substantial isolation between full power, 90 degree shifted, filtered output TXOUT relative to noise RXOUT. Isolation resistor ISO4 performs a function (terminating reflections) similar to isolation resistor ISO2 in FIG. 2, as discussed above.

The above conventional architectures suffer because the isolation from the transmit port Port1 relative to the receive port Port3 is a function of antenna load changes. The antenna load changes may be characterized by an antenna VSWR (Voltage Standing Wave Ratio). Thus, conventional architectures suffer from degraded isolation whenever VSWR changes, and an antenna load can often change by a factor of 10 (up to 10:1 VSWR).

Additionally, if the antenna is not almost perfectly matched, then the performance of the conventional architectures degrades. For example, if the dual hybrid has an impedance of 50 ohms, and if the antenna does not have an impedance of 50 ohms, then the antenna is mismatched at the antennal port Port2 of the dual hybrid. Further, antenna load changes may change the impedance of the antenna during operation. Conventional architectures cannot solve these problems.

SUMMARY

The present disclosure relates to a tunable duplexer architecture that addresses the need to reduce system cost and system size.

In one embodiment, a dual hybrid duplexer includes two hybrids, two intra-filters, a tunable isolation load, and a phase shifter. The phase shifter may be located at the isolation port. The phase shifter may be located at the antenna port.

In one embodiment, a dual hybrid duplexer includes two hybrids, two intra-filters, a tunable isolation load, a first phase shifter, and a second phase shifter. The first phase shifter is located at the isolation port. The second phase shifter is located at the antenna port. The first and second phase shifters have a difference of 90 degrees (plus or minus 10 degrees).

The dual hybrid duplexer may further include an impedance tuner at the antenna port.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
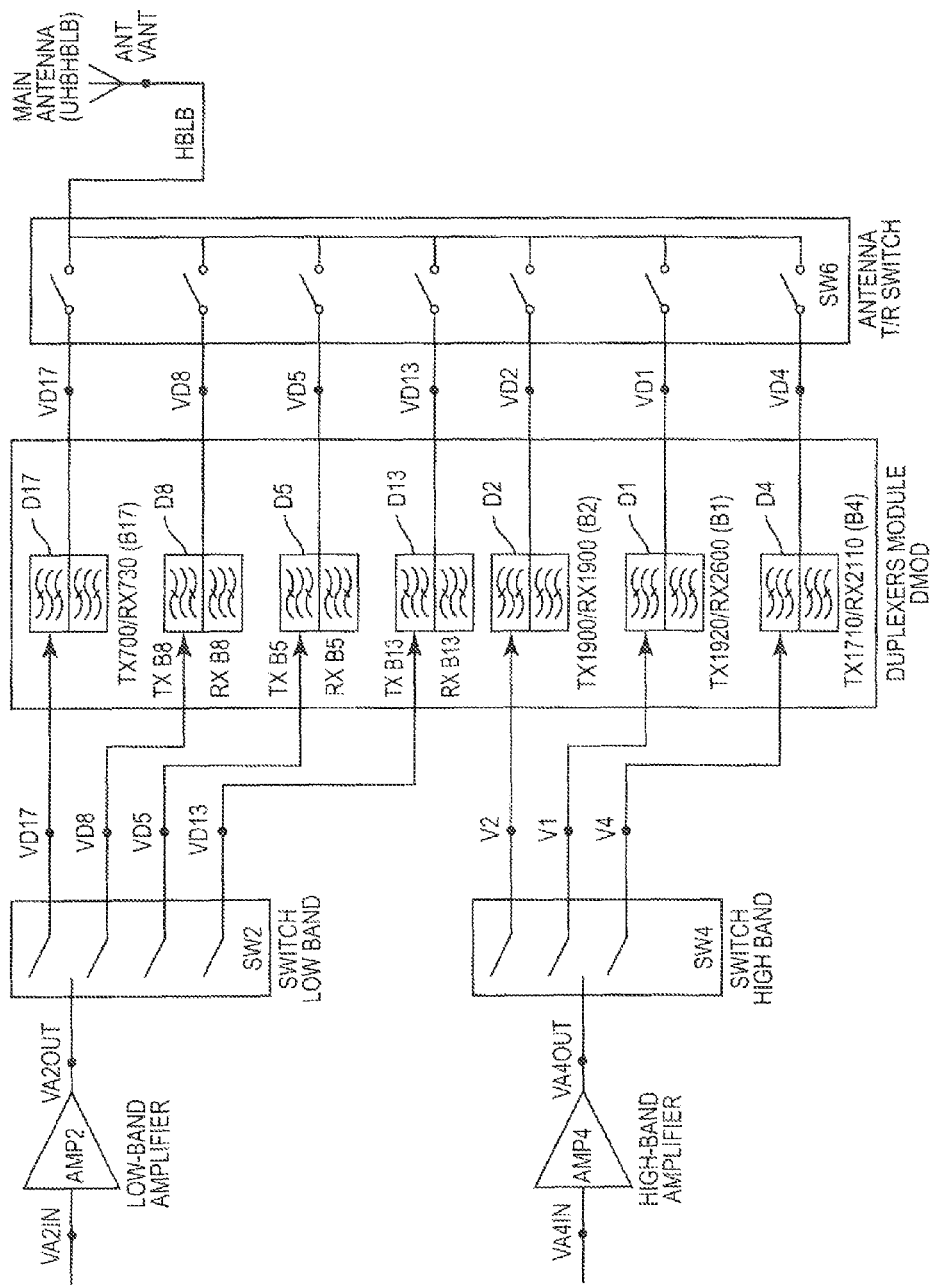
FIG. 1 illustrates a conventional system with amplifiers, band switches, duplexers, an antenna T/R (Transmit Receive) switch, and an antenna.
Figure 2A:
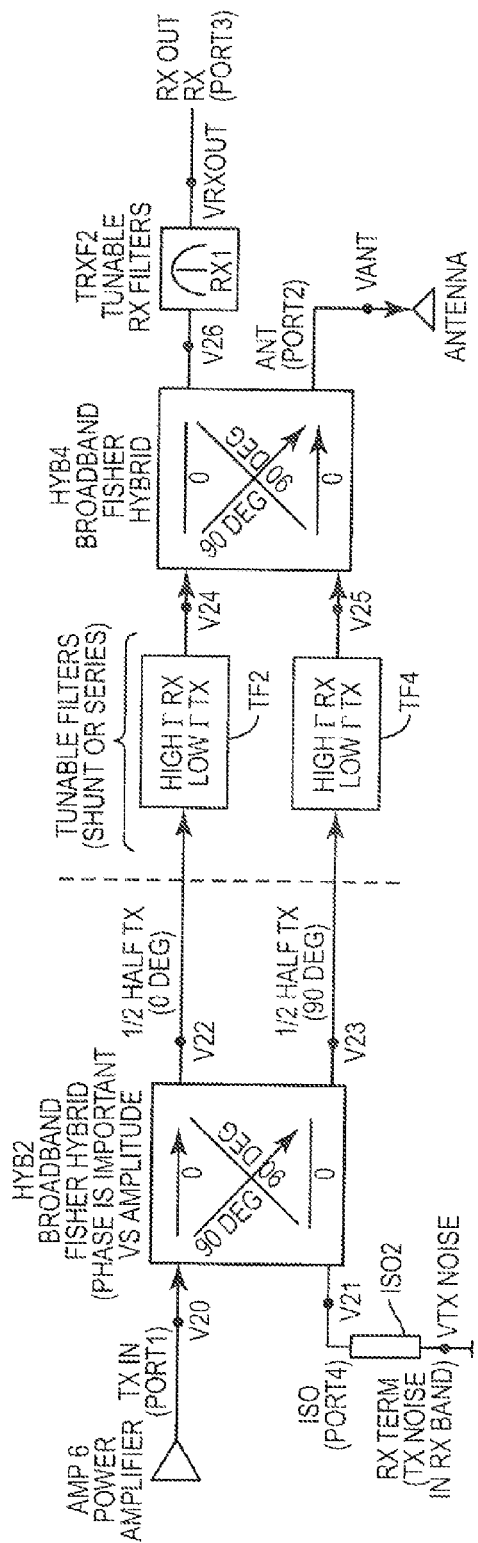
FIG. 2(a) is a conventional dual hybrid tunable duplexer, with intra-filters that reflect RX signals and pass TX signals, illustrating the paths from a power amplifier to an antenna.
Figure 2B:
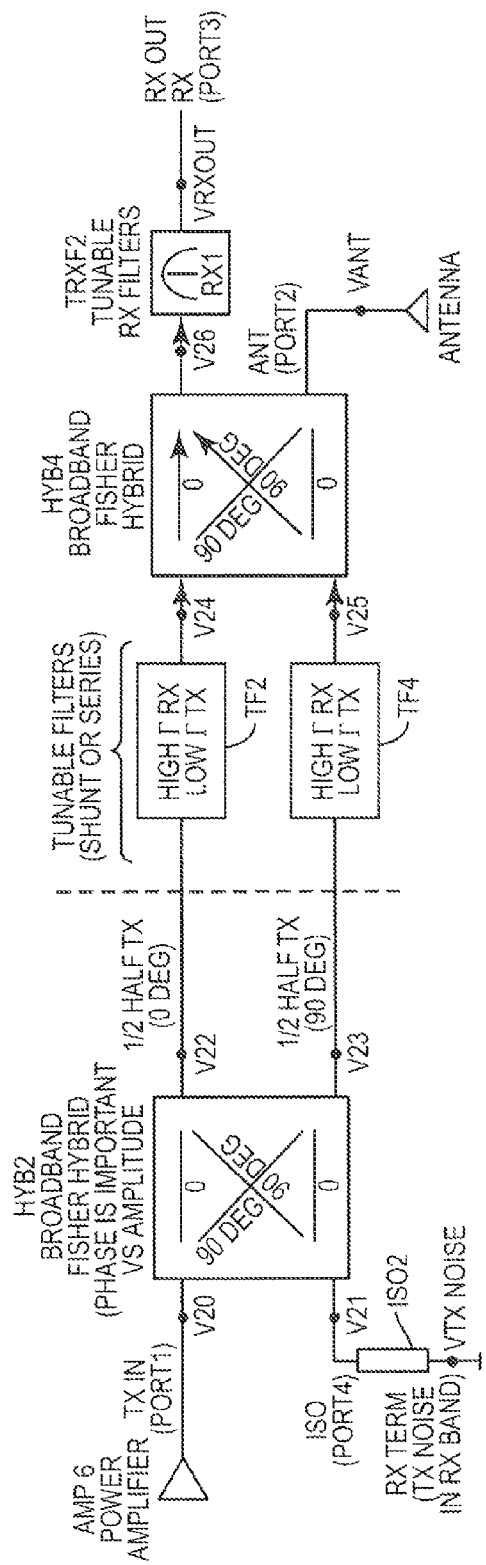
FIG. 2(b) illustrates isolation at the receiver port caused by the second hybrid coupler.
Figure 2C:
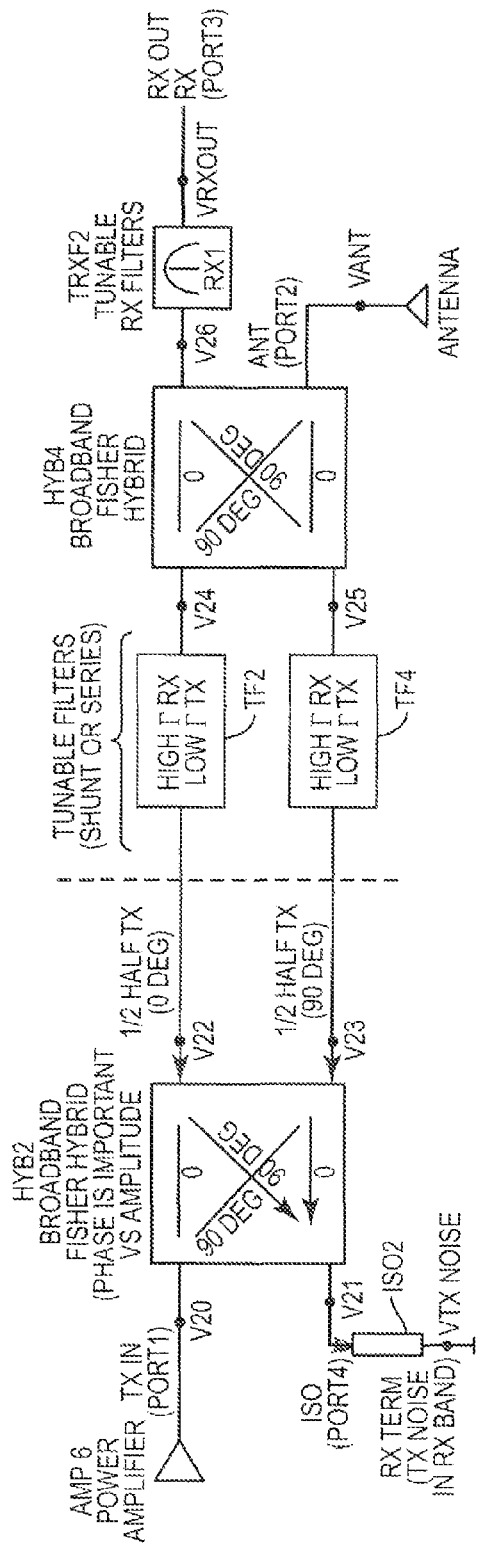
FIG. 2(c) illustrates reflections from the tunable filters directed towards the isolation port.
Figure 2D:
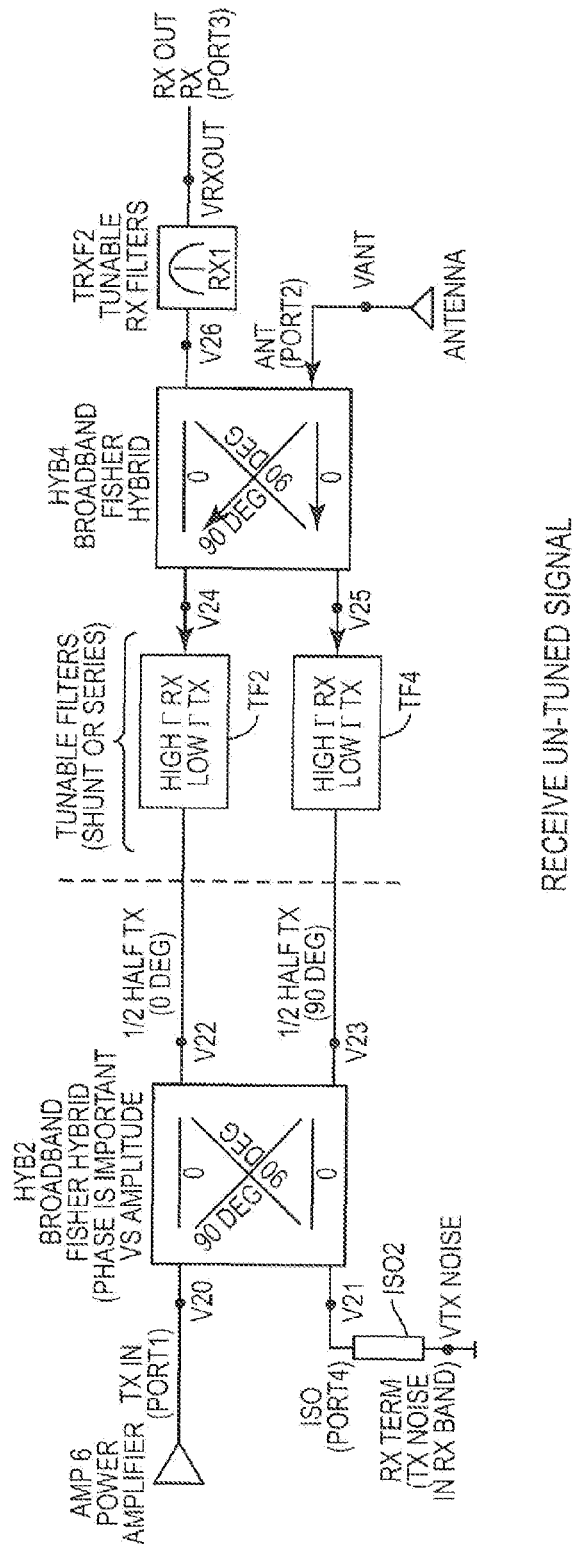
FIG. 2(d) illustrates receiving an un-tuned signal.
Figure 2E:
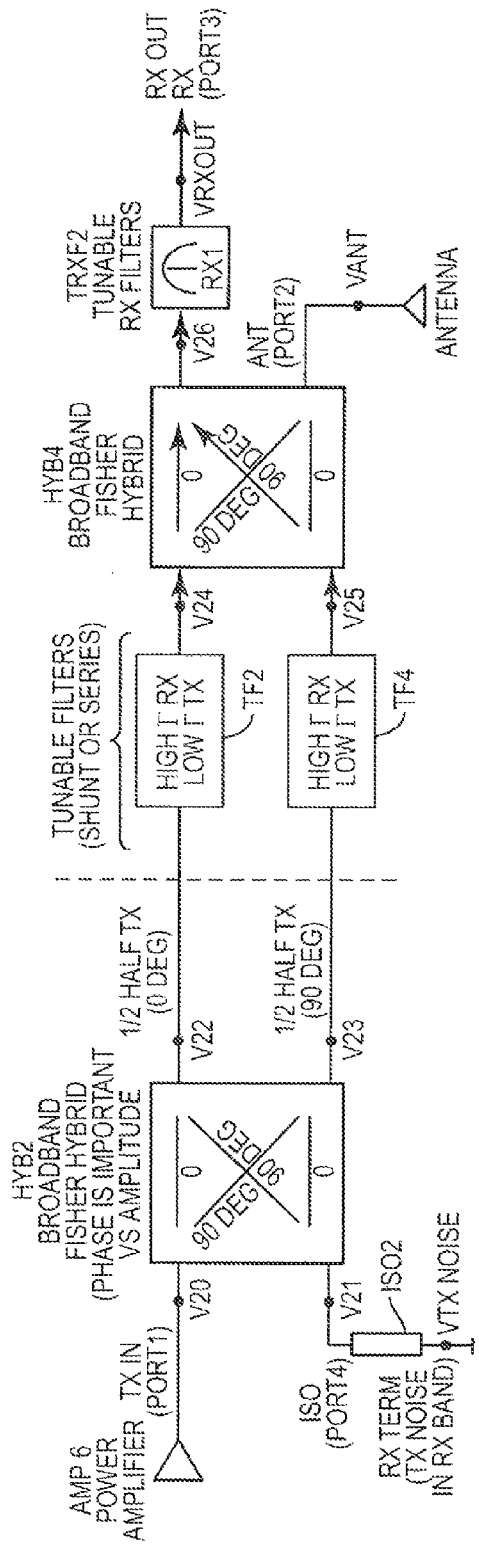
FIG. 2(e) illustrates reflecting and tuning the received signal.
Figure 3A:
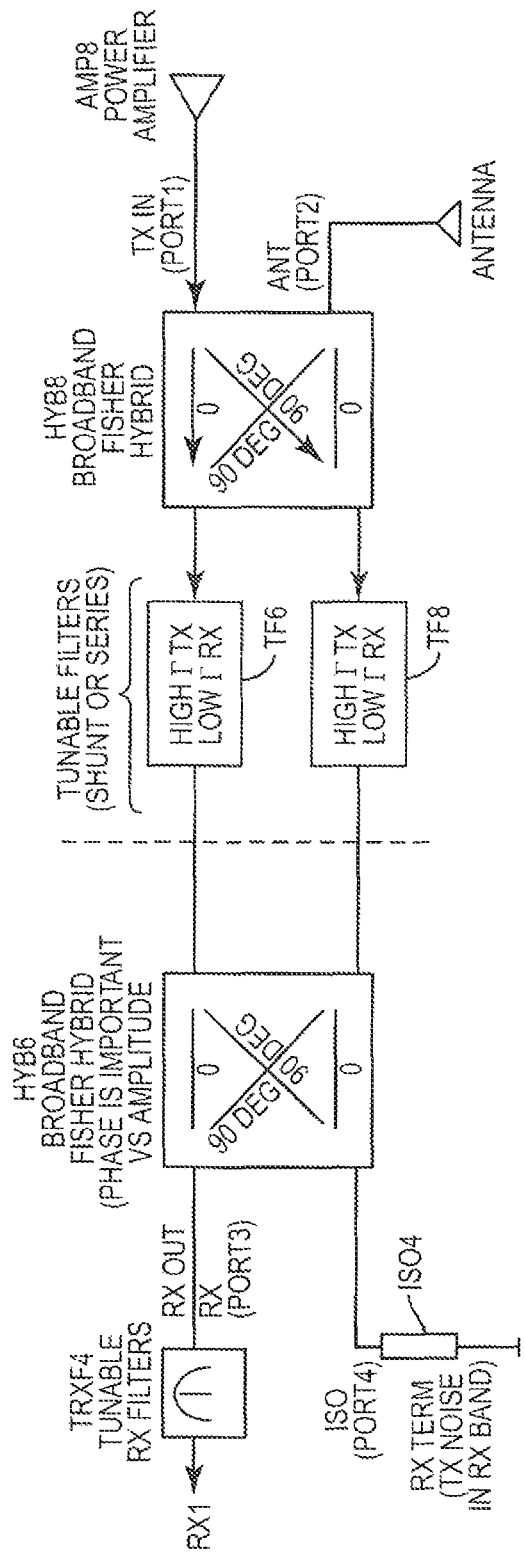
FIG. 3(a) is a second type of conventional dual hybrid tunable duplexer, with intra-filters that pass RX signals and reflect TX signals, illustrating the paths from a power amplifier to the intra-filters.

In FIG. 3(a), the amplifier AMP8 outputs a signal TXIN for filtering and transmission. This signal is split by hybrid HYB8 into a half-power, un-shifted signal to filter TF6, and into a half-power, 90 degree shifted signal to filter TF8.

Figure 3B:
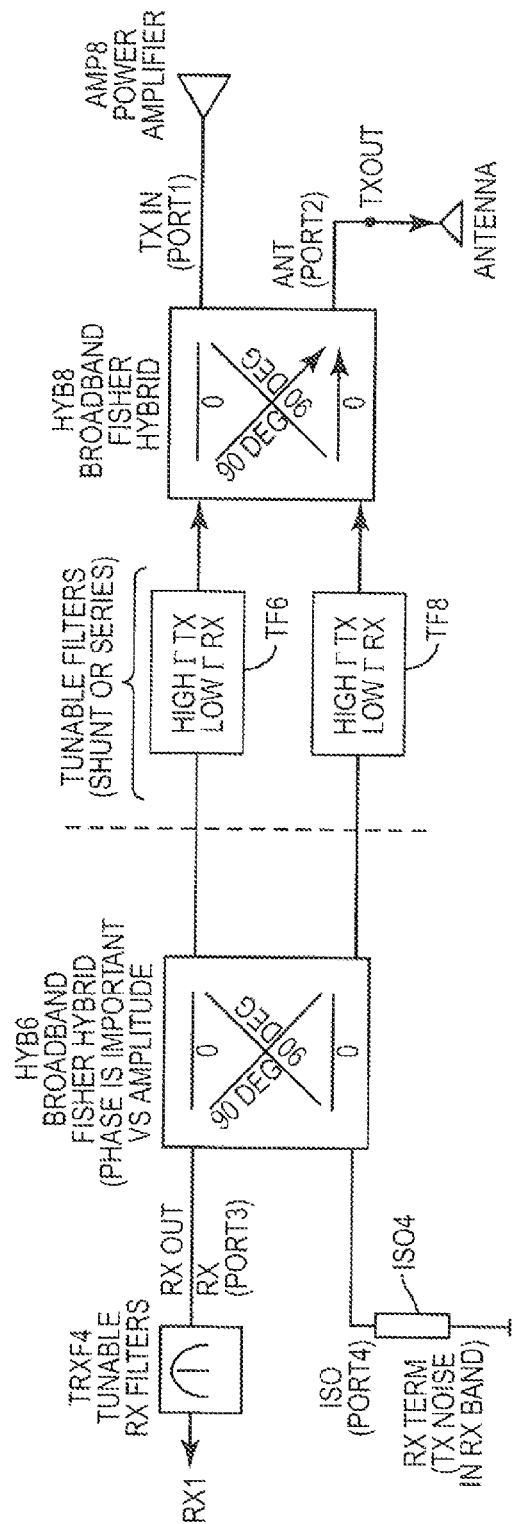

FIG. 3(b) reflects transmission signals by the intra-filters. The split signals from the previous figure are each reflected towards the antenna.

Figure 3C:
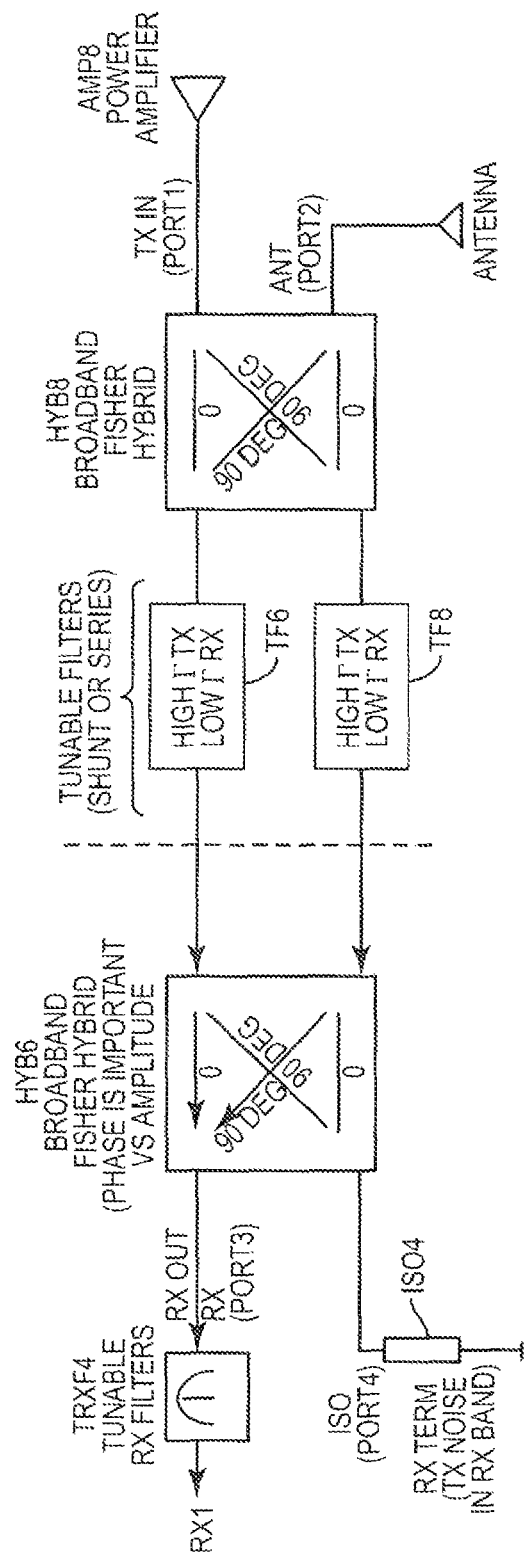

FIG. 3(c) illustrates that the RX noise is cancelled.

Figure 4:
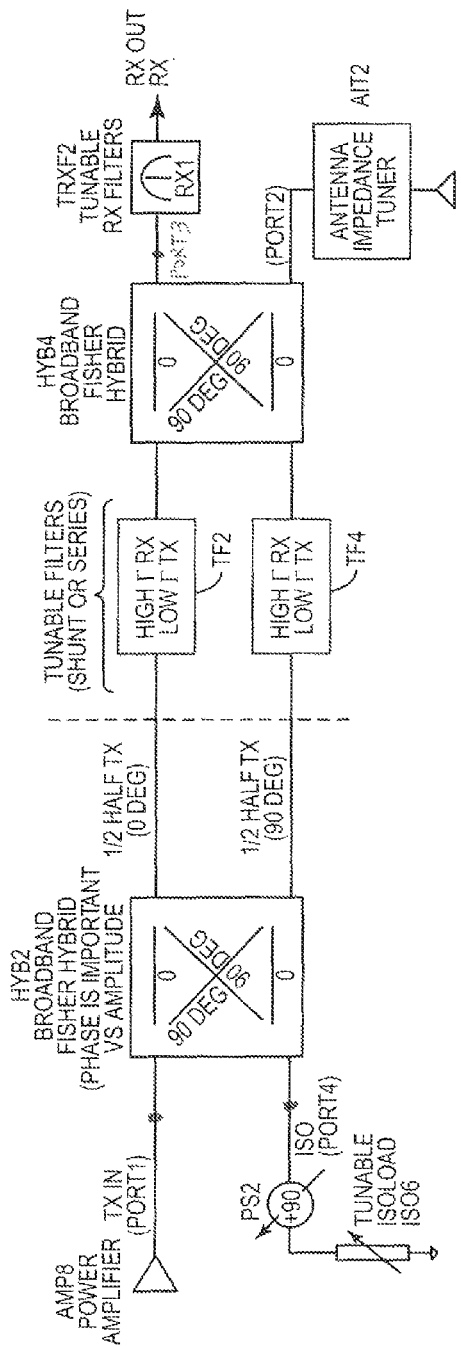

FIG. 4 illustrates a dual hybrid architecture including a 90 degree phase shifter and a tunable isolator load at the isolation port, and intra-filters that reflect RX (have high Γ RX).

Figure 5:
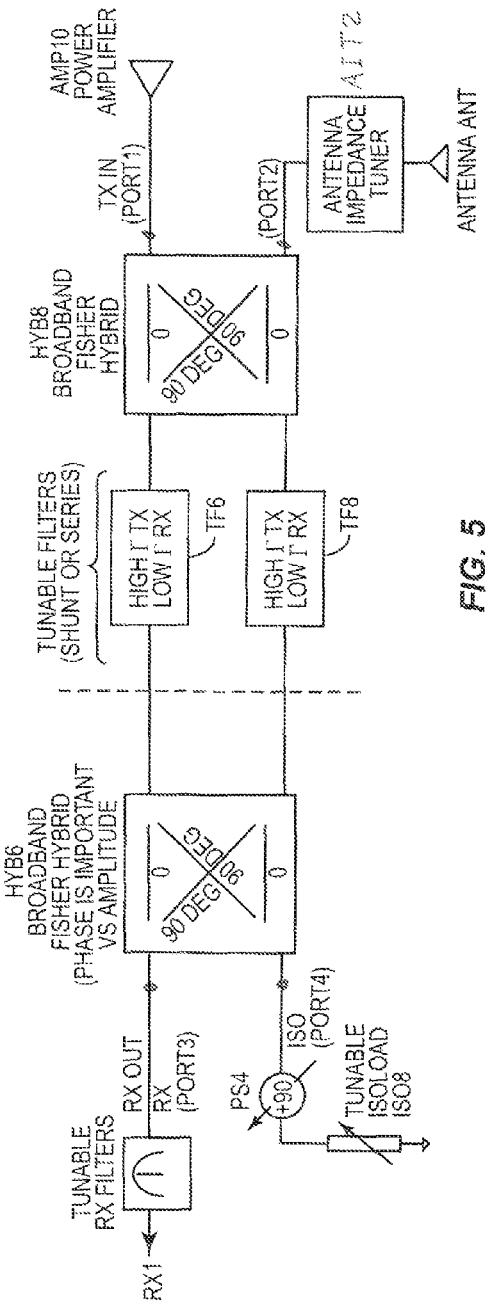

FIG. 5 illustrates a dual hybrid architecture including a 90 degree phase shifter and a tunable isolator load at the isolation port, and intra-filters that reflect TX (have high Γ TX).

Figure 6A:
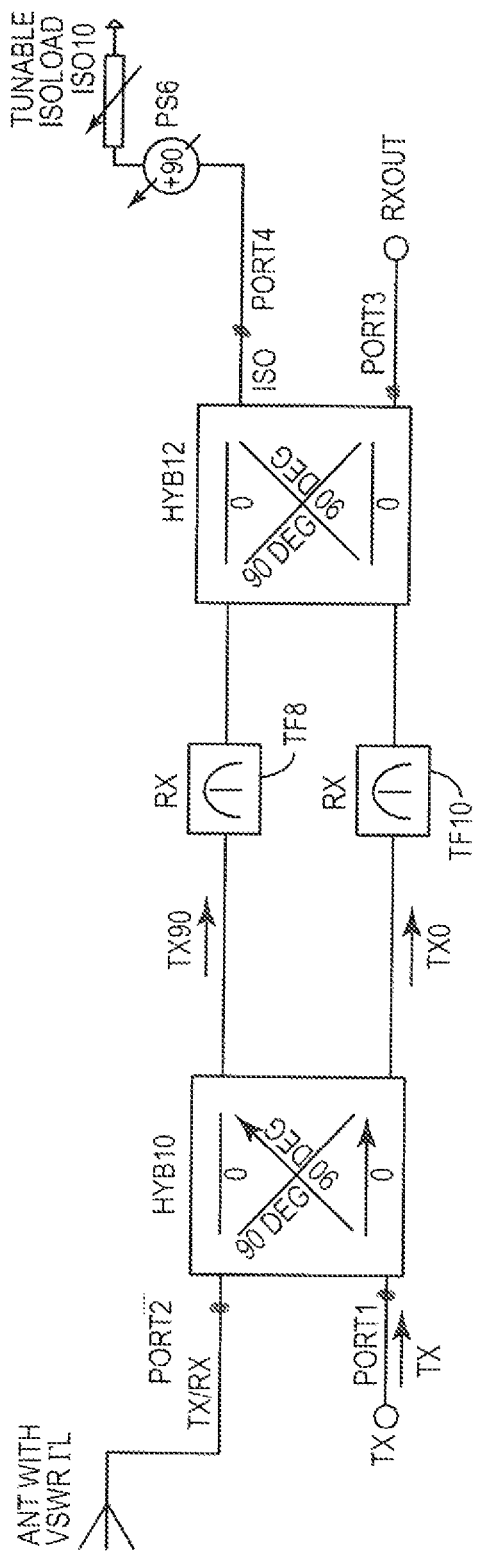
Figure 6B:
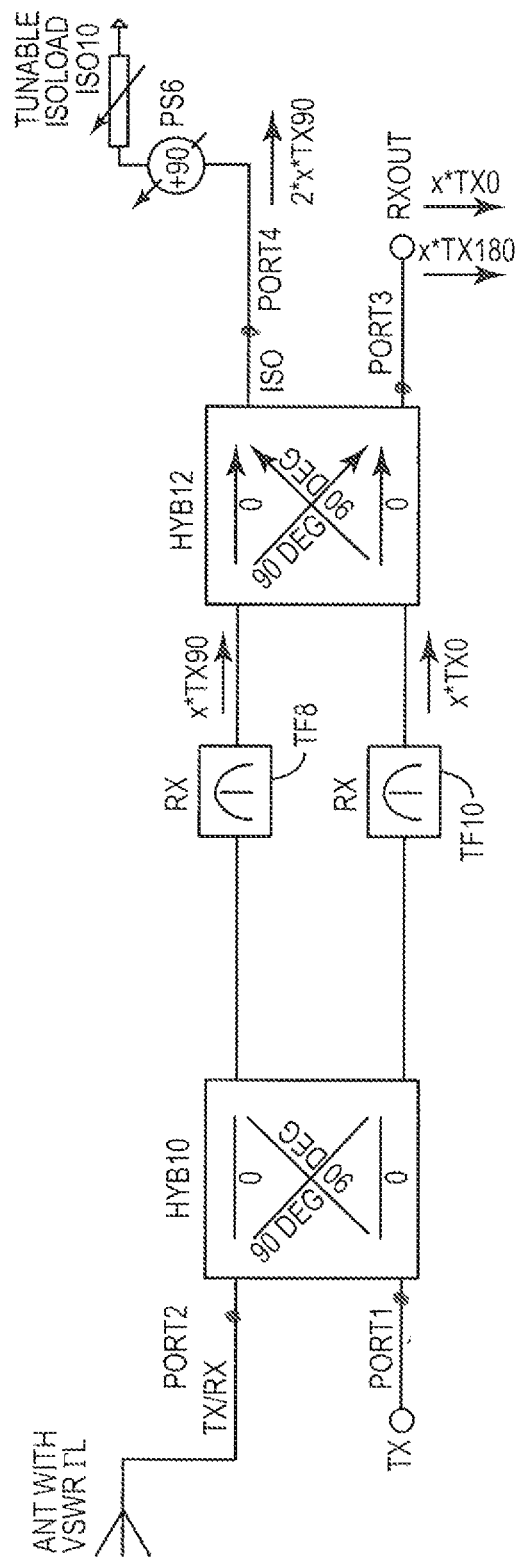
Figure 6C:
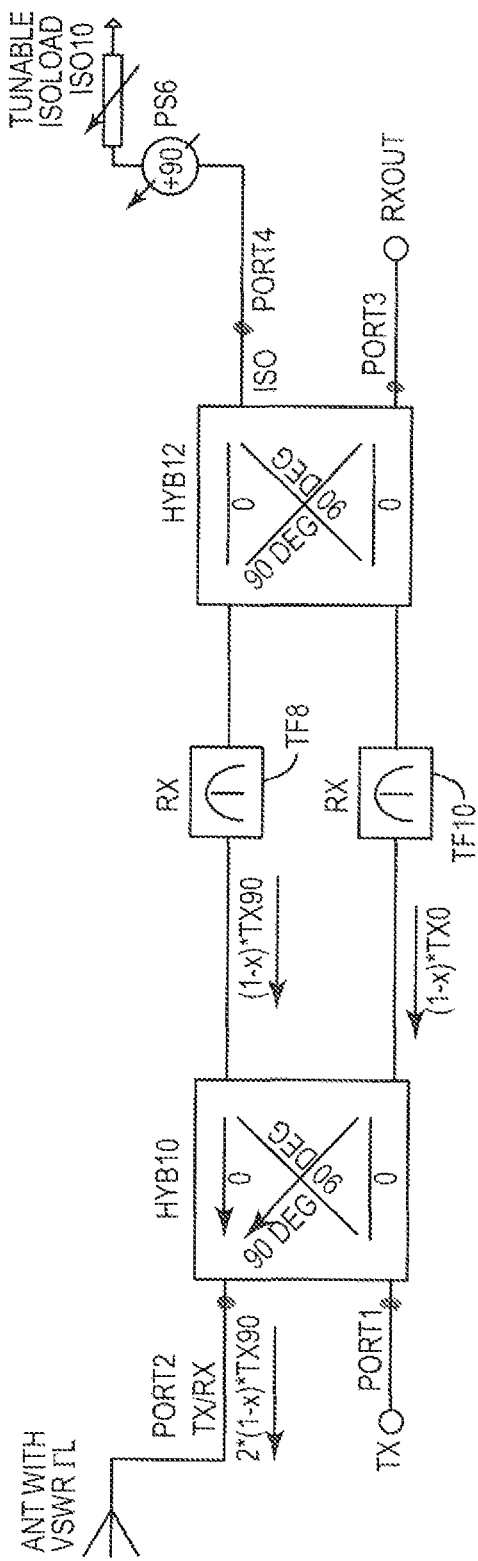
Figure 6D:
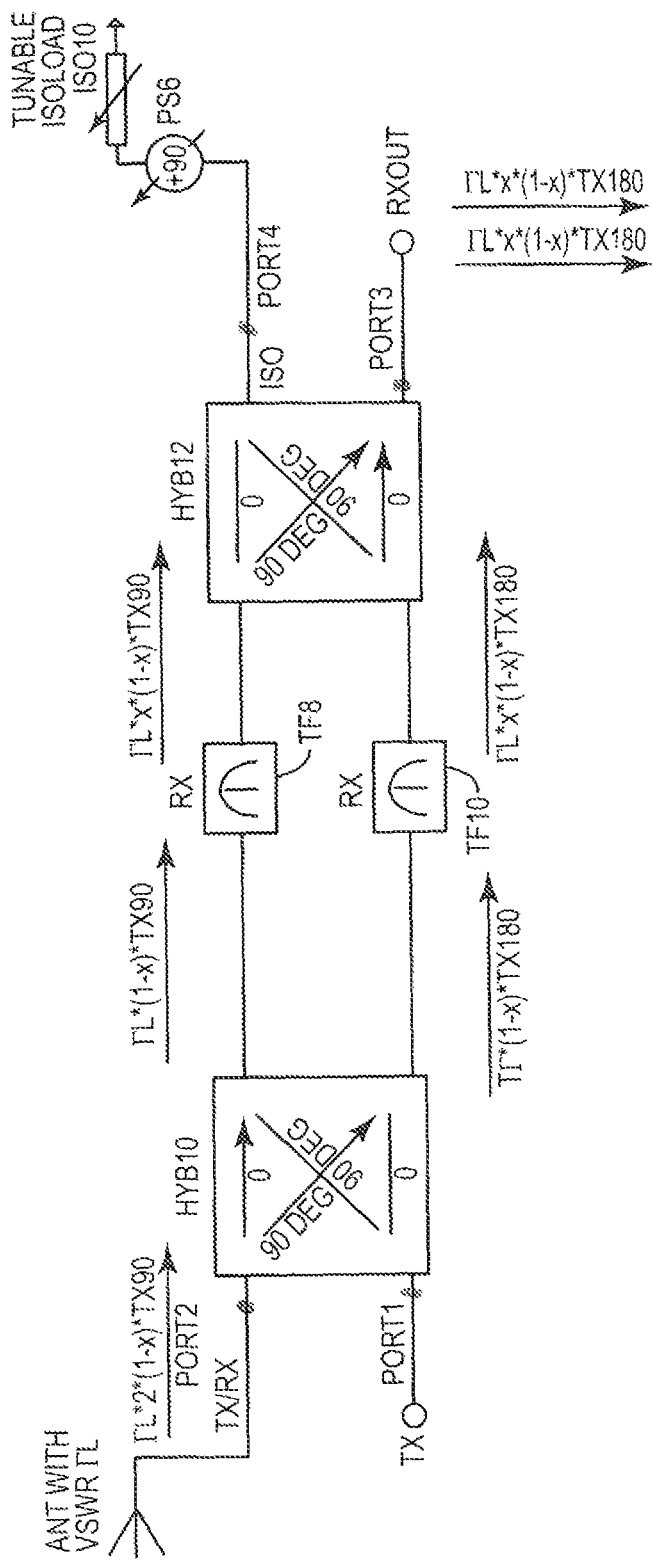
Figure 6E:
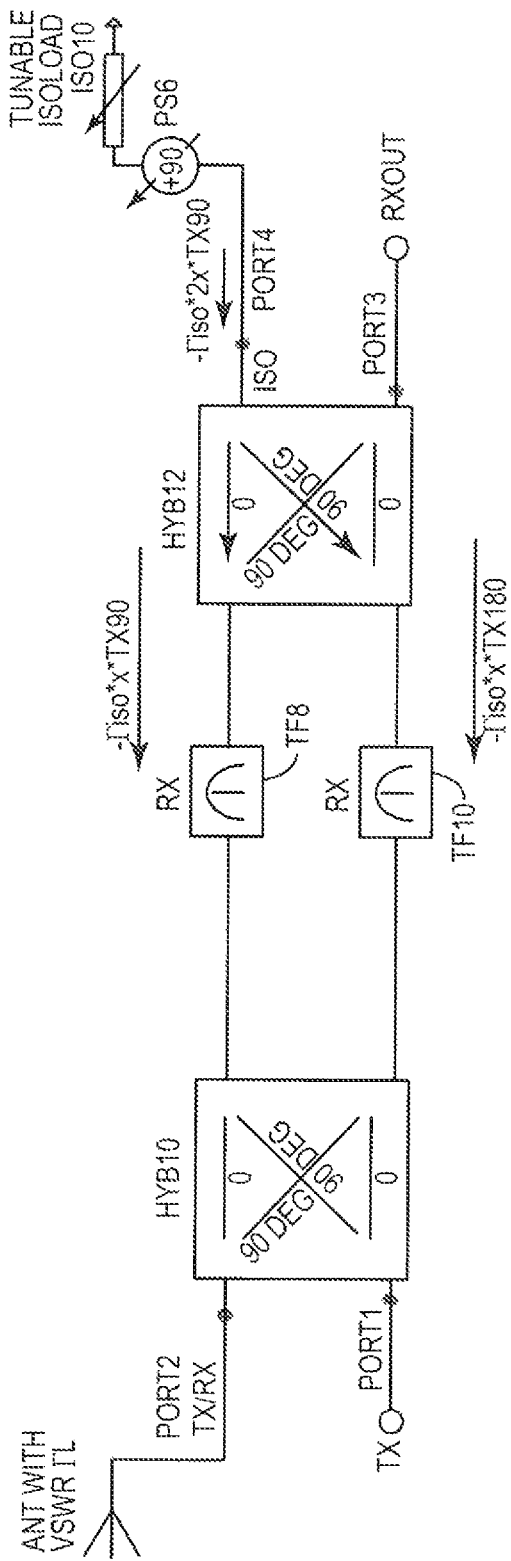
Figure 6F:
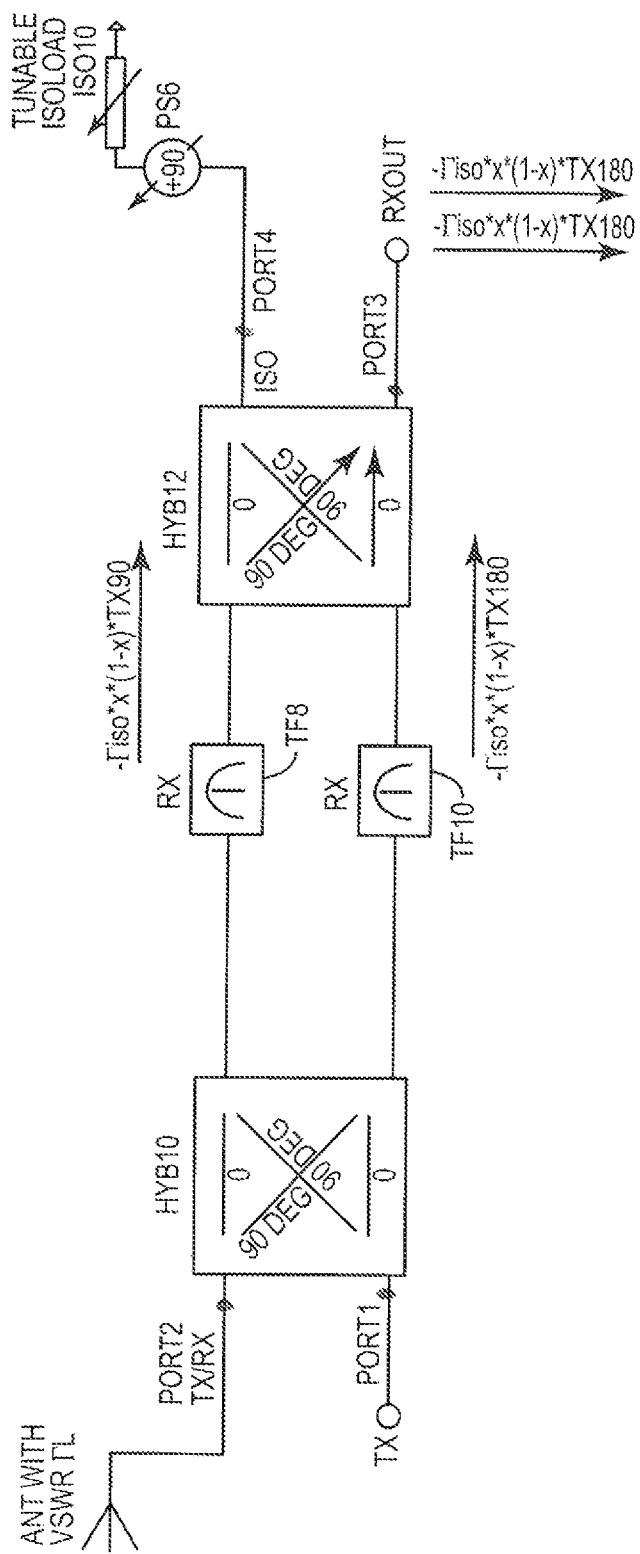
Figure 6G:
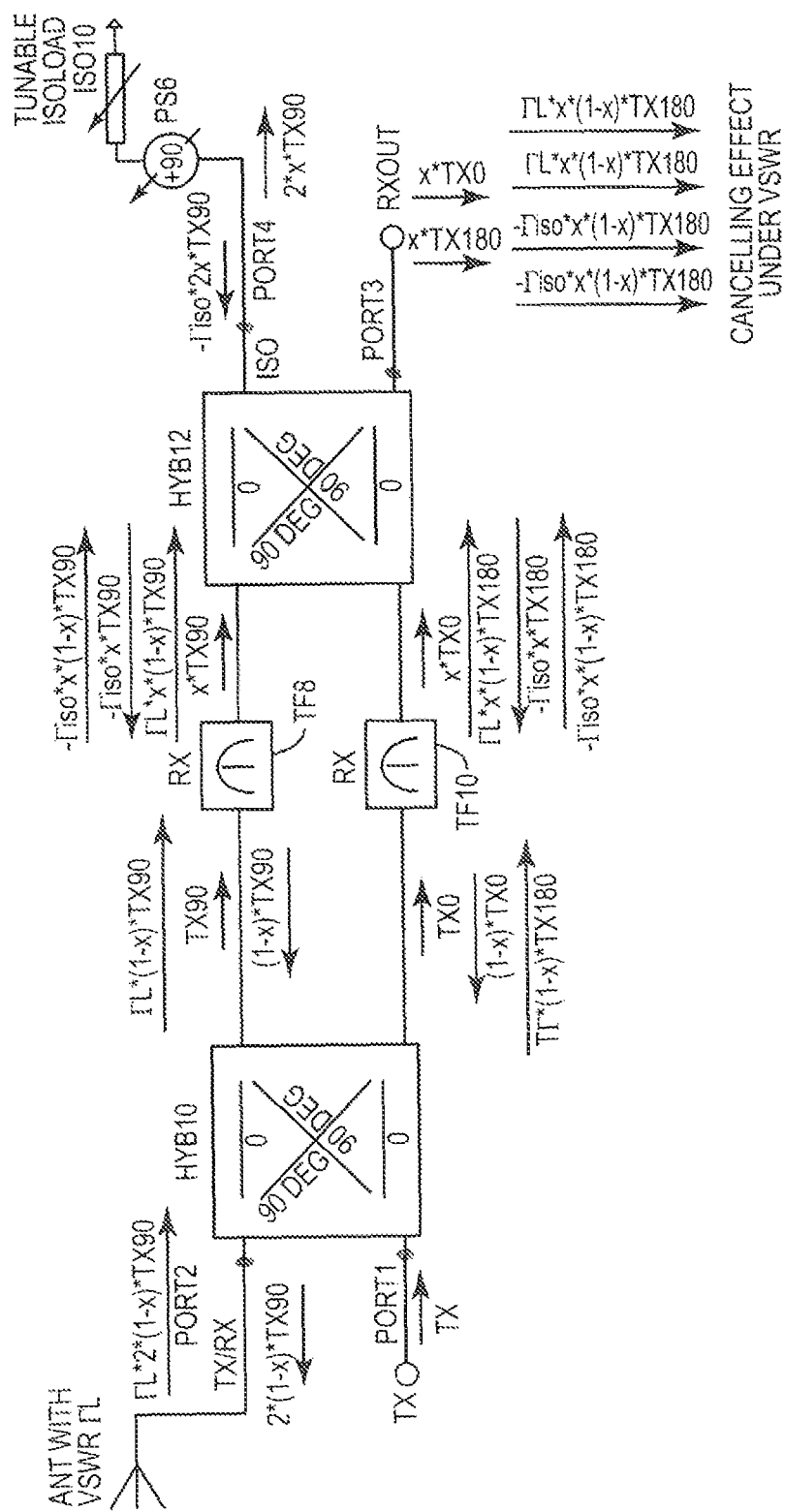
Figure 7:
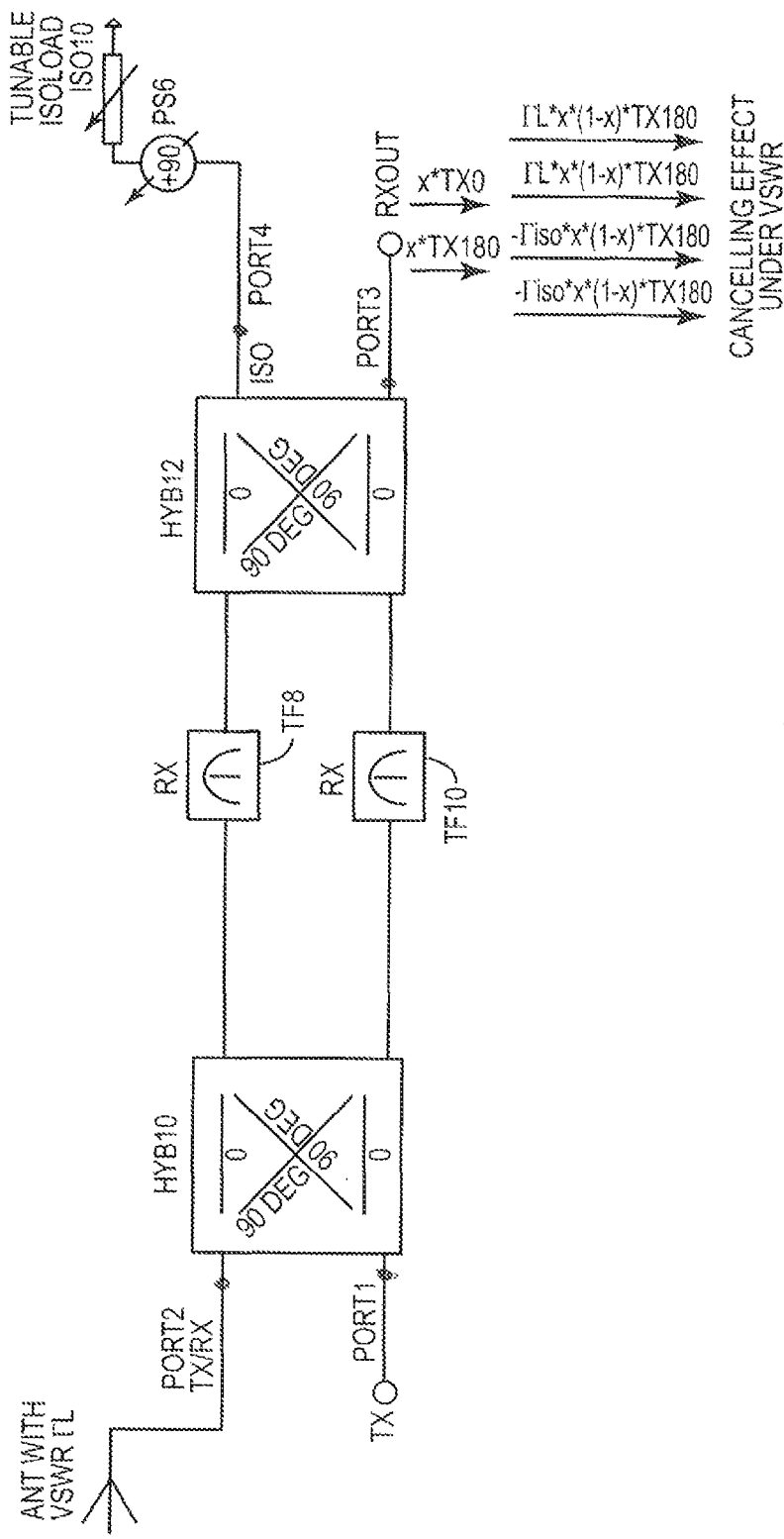

FIGS. 6(a) through 6(g) illustrate the flows resulting from a transmit signal TX injected at the TX port FIG. 7 illustrates only the outputs signals at RXOUT at Port3.

Figure 8:
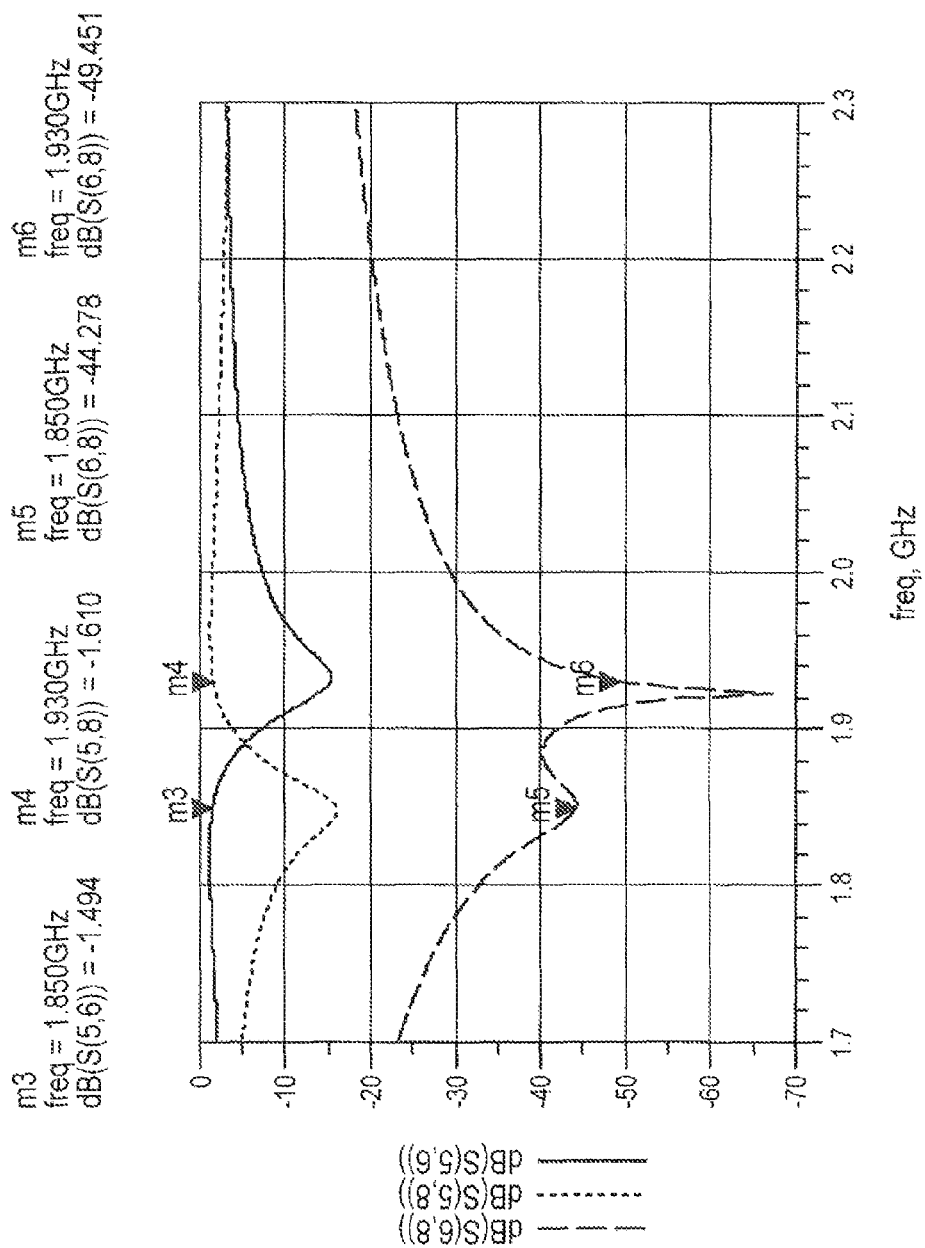

FIG. 8 illustrates the results of a simulation of a dual hybrid based on a fisher hybrid network with VSWR1:1 (indicating that the antenna is matched).

Figure 9:
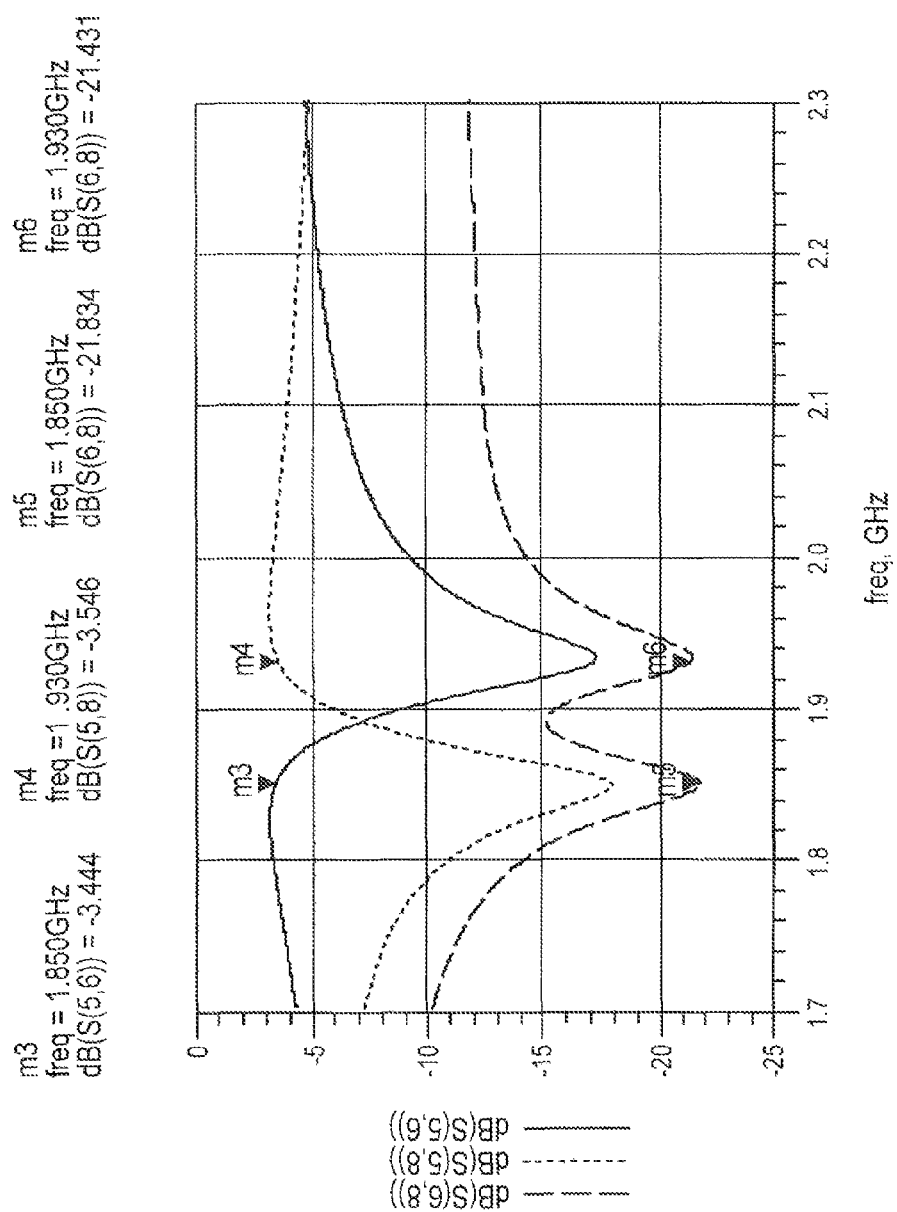

FIG. 9 illustrates the results of a simulation of a dual hybrid based on a fisher hybrid network with VSWR of 4:1 at the antenna port (indicating that the antenna is not matched), and the isolation port is not tuned.

Figure 10:
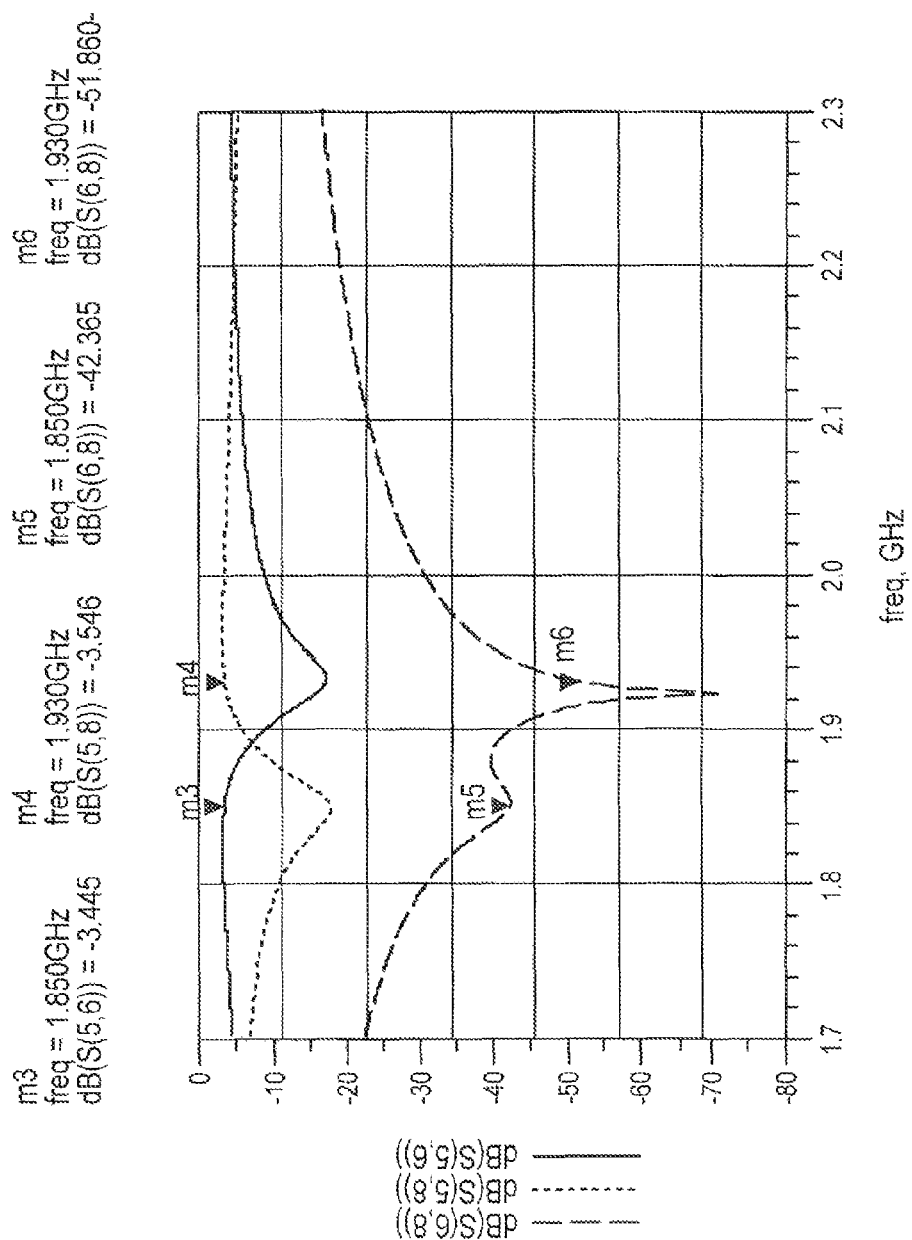

FIG. 10 illustrates the results of a simulation of a dual hybrid based on a fisher hybrid network with VSWR of 4:1 at the antenna port (indicating that the antenna is not matched), and the isolation port is tuned.

Figure 11:
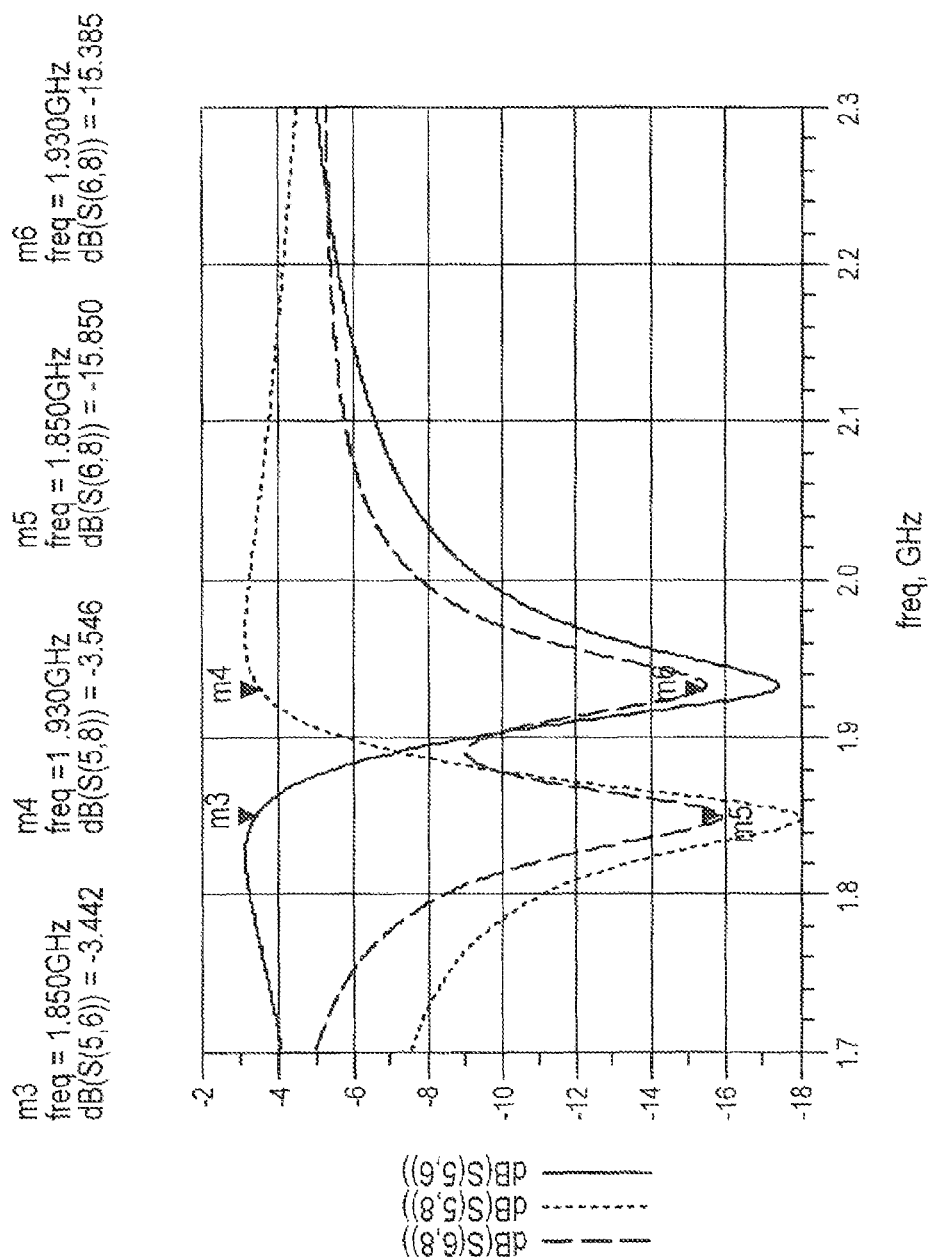

FIG. 11 illustrates the results of a simulation with VSWR 4:1, Q=60, with tuning on the isolation port of 4:1, and 0 degree phase shift at the isolation port.

Figure 12:
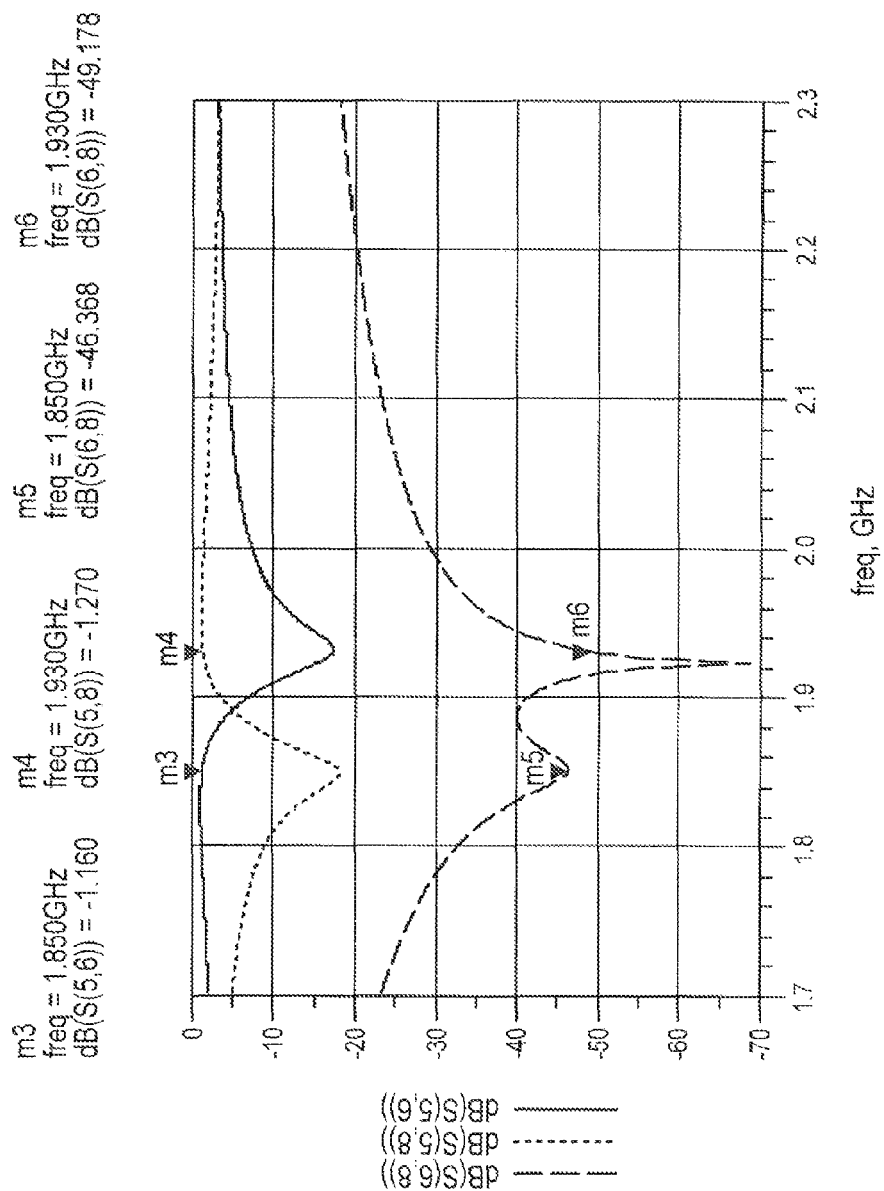

FIG. 12 illustrates isolation and VSWR 1:1, with quality factor Q=90.

Figure 13:
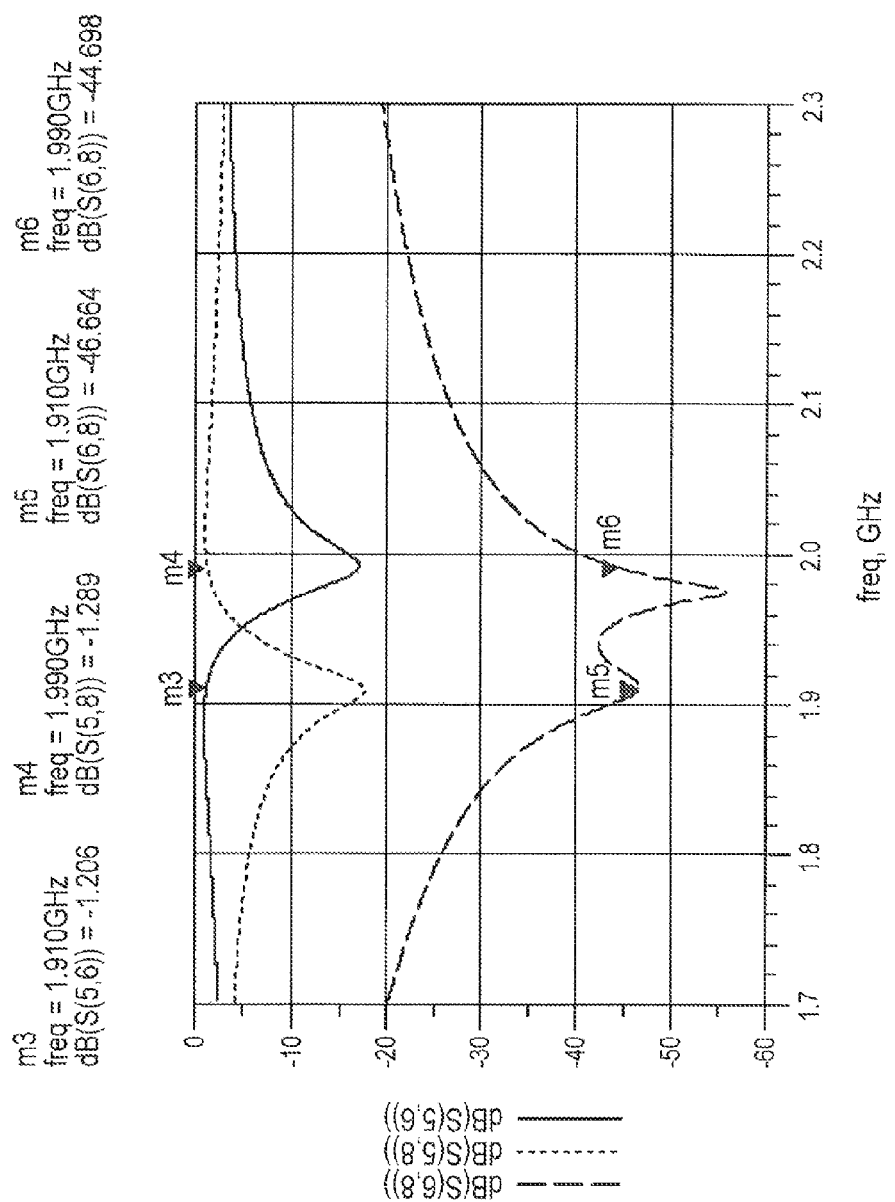

FIG. 13 illustrates isolation for VSWR 1:1 with quality Q=90 at the upper edge of band 2 frequencies.

Figures 14A, 14B:
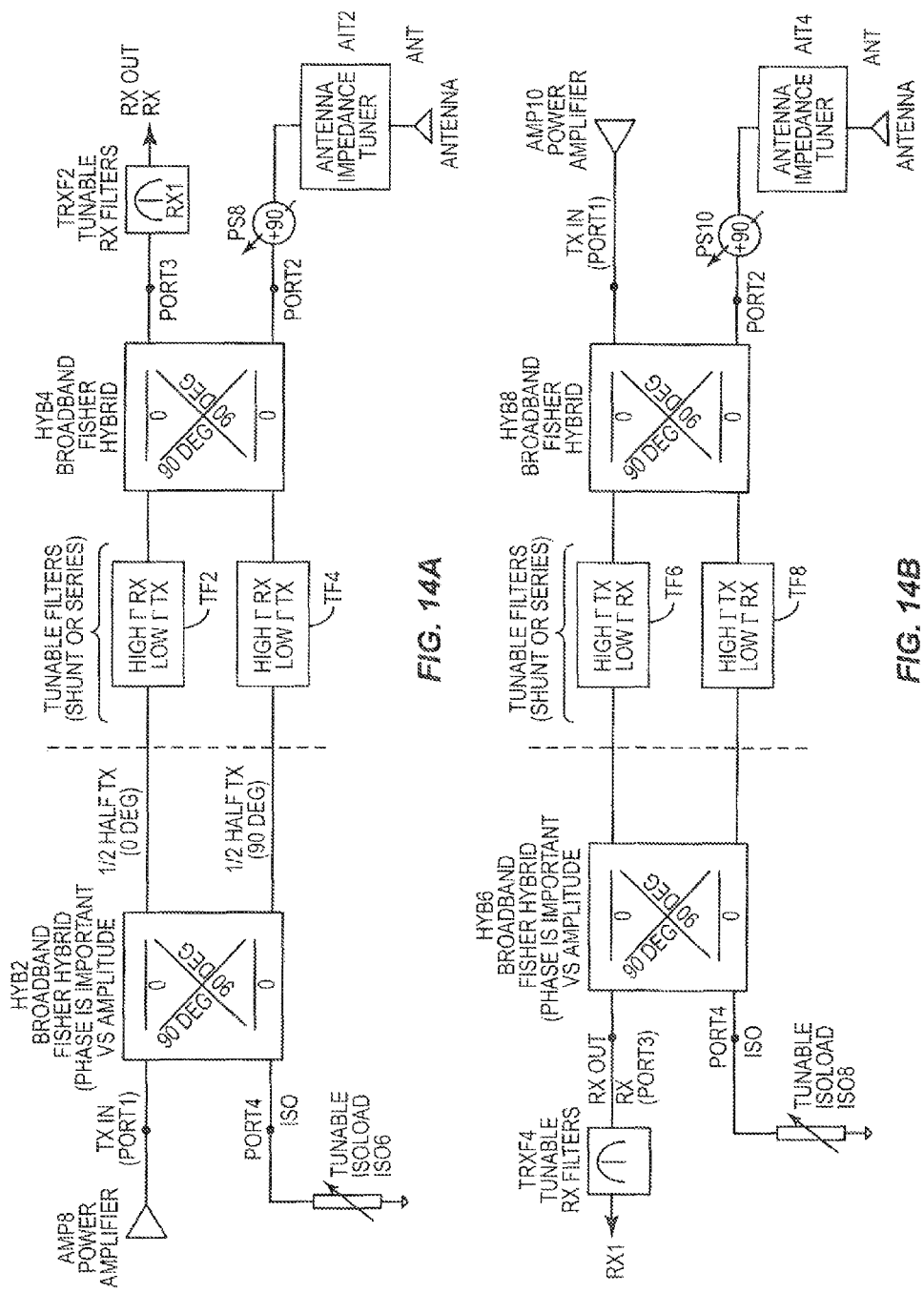

FIG. 14A illustrates placing a phase shifter at the antenna port of the duplexer, using high Γ RX intra-filters.

FIG. 14B illustrates placing a phase shifter at the antenna port of the duplexer, using high Γ TX intra-filters.

Figure 15:
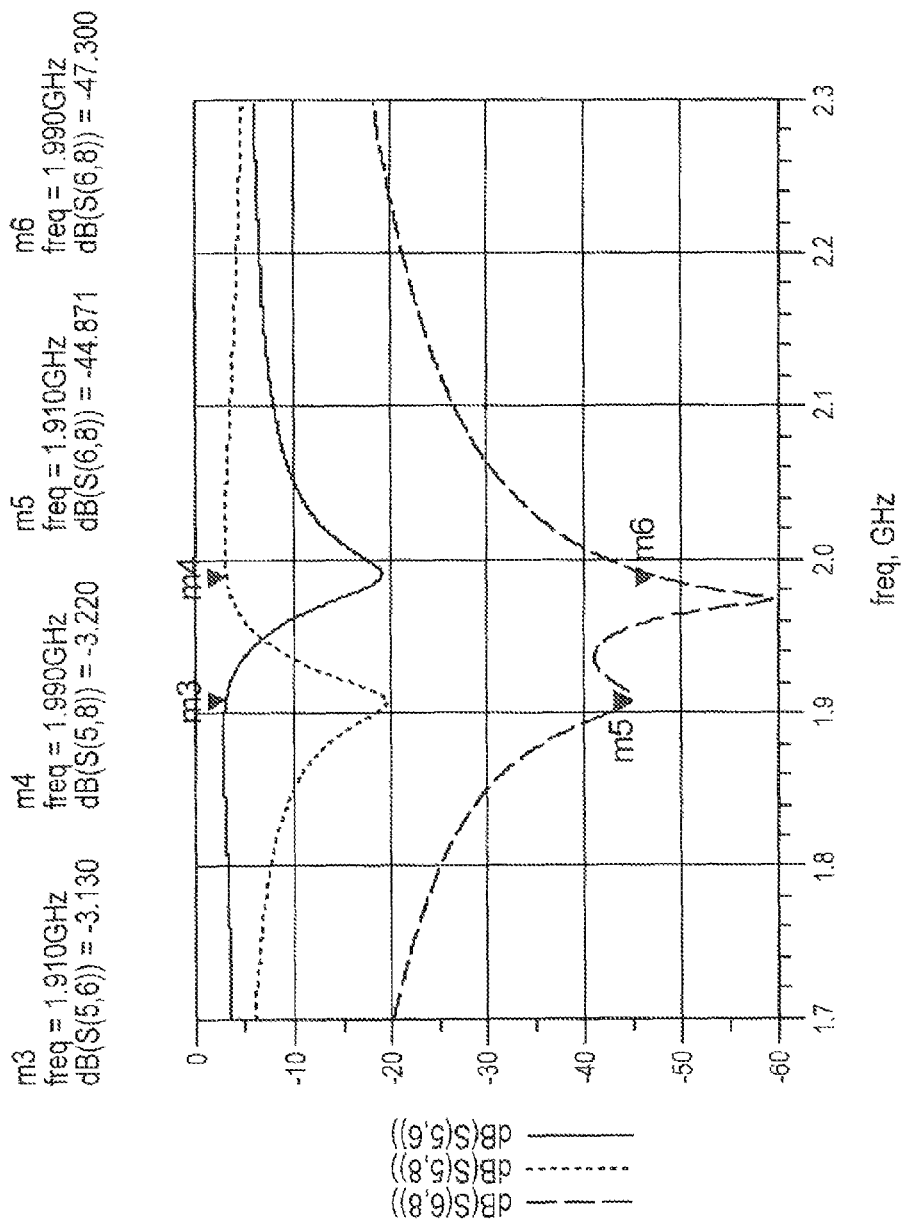

FIG. 15 illustrates isolation for VSWR 4:1 (Q=90), at the upper edge of band2 frequencies, with a 90 degree phase shifter on the antenna port.

FIG. 16A illustrates using two phase shifters having a difference of 90 degrees, with intra-filters having high Γ RX.

FIG. 16B illustrates using two phase shifters having a difference of 90 degrees, with intra-filters having high Γ TX.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 4. FIG. 4 illustrates a dual hybrid architecture including a 90 degree phase shifter and a tunable isolator load at the isolation port, and intra-filters that reflect RX (have high Γ RX).

FIG. 4 is similar to FIG. 3, with the following modifications: the isolation load ISO6 is tunable; a phase shifter PS2 is inserted between the isolation load ISO6 and Port4 of hybrid HYB2, and an antenna impedance tuner AIT2 is inserted between Port2 of hybrid HYB4 and the antenna ANT. These modifications create desired cancellations when the antenna ANT is mismatched.

FIG. 5. FIG. 5 illustrates a dual hybrid architecture including a 90 degree phase shifter and a tunable isolator load at the isolation port, and intra-filters that reflect TX (have high Γ TX).

FIG. 5 is similar to FIG. 4, with the following modifications: the isolation load ISO6 is tunable; a phase shifter PS2 is inserted between the isolation load ISO6 and Port4 of hybrid HYB6, and an antenna impedance tuner AIT4 is inserted between Port2 of hybrid HYB8 and the antenna ANT. These modifications create desired cancellations when the antenna ANT is mismatched.

FIGS. 6(a) through 6(h) illustrate the flows resulting from a transmit signal TX injected at the transmit port Port1. These figures are similar to FIG. 5, but with additional details regarding signal flows. The intra-filters in FIGS. 6(a) through 6(h) are highly TX reflective (high Γ TX).

FIG. 6(a). FIG. 6(a) illustrates a transmit signal TX received from a power amplifier not shown) and injected into the transmit port Port1 of hybrid HYB10. As a result, HYB10 sends a 90 degree shifted signal TX90 towards tunable filter TF8, and sends an un-shifted signal TX0 towards tunable filter TF10. In one embodiment, tunable filters TF8 and TF10 are identical.

Tunable filters TF8 and TF10 may be band pass filters centered at a receiving frequency RX, thus having a low Γ (low reflection) at RX and having a high Γ (high reflection) at TX. Thus TF8 and TF10 will pass at the receiving frequency RX, and will reflect at the transmitting frequency TX. The reflection coefficient Γ equals (1-x), wherein x is the transmission coefficient. Each tunable filter will pass a portion of the received signal (see FIG. 6(b)), and will reflect a portion of the received signal (see FIG. 6(c)).

FIG. 6(b). FIG. 6(b) illustrates transmissions through the tunable filters TF8 and TF10. Tunable filter TF8 passes x*TX90 towards hybrid HYB12. Tunable filter TF10 passes x*TX0 towards hybrid HYB12.

As a result, hybrid HYB12 sends 2*x*TX90 (a combination of x*TX90 and x*TX90) out of Port4 towards phase shifter PS6. Hybrid HB12 also sends x*TX0 and x*TX180 out of Port3 and towards RXOUT (these two signals are 180 degrees out of phase, so they cancel each other out, as desired).

The signal 2*x*TX90 (a combination of x*TX90 and x*TX90) out of Port4 towards phase shifter PS6 is a relatively small signal, because x (transmission factor for TX) is very small for filters TF8 and TF10 (high Γ TX and low Γ RX, which is equivalent to low x TX and high x RX).

Therefore PS6 and ISO10 can be small or moderately sized, relative to conventional tunable circuits that may have to deal with power levels of perhaps 20 or 30 dB greater power.

FIG. 6(c). FIG. 6(c) illustrates reflections from tunable filters TF8 and TF10, occurring at the same time as the transmissions from these tunable filters discussed above in FIG. 6(b).

Tunable filter TF8 reflects a portion (1-x) of the received signal TX90 (received in FIG. 6(a)), thus reflecting (1-x)*TX90 to the left towards HYB10. Similarly, tunable filter TF10 reflects a portion (1-x) of the received signal TX0, thus reflecting (1-x)*TX0 to the left towards HYB10.

Hybrid HYB10 receives these two reflected signals, and sends a transmission signal 2*(1-x)*TX90 (a combined (1-x)*TX90 and (1-x)*TX90) towards antenna ANT. This transmission signal is similar to the transmission signal in FIG. 3 discussed above, wherein the initial transmission signal TXIN from power amplifier AMP8 is split by hybrid HYB8, the split signals are effectively filtered (or tuned) by reflection (high Γ TX) by tunable filters TF6 and TF8, and finally combined by hybrid HYB8 at port Port2 on the way to the antenna ANT.

FIG. 6(d). FIG. 6(d) illustrates a reflected signal from the antenna ANT. As discussed in FIG. 6(c), hybrid HYB10 sends signal 2*(1-x)*TX90 to the antenna ANT. The antenna ANT might not be perfectly matched with the dual hybrid circuit, and thus might reflect some of this signal back to the hybrid HYB10, with a reflection coefficient of ΓL. Thus, the reflected signal is ΓL*2*(1-x)*TX90 towards hybrid HYB10.

Hybrid HYB10 receives this reflected signal and sends part of it as ΓL*(1-x)*TX90 towards tunable filter TF8, and sends part of it (after shifting 90 degrees) as ΓL*(1-x)*TX180 towards tunable filter TF10.

Tunable filter TF8 passes ΓL*x*(1-x)*TX90 towards the top left of hybrid HYB12. Tunable filter TF10 passes ΓL*x*(1-x)*TX180 towards the bottom left of hybrid HYB12.

Hybrid HYB10 shifts the received upper signal by 90 degrees and outputs it at Port3 as ΓL*x*(1-x)*TX180. Hybrid HYB10 receives the lower signal and outputs it (unshifted) at Port3 as ΓL*x*(1-x)*TX180.

FIG. 6(e). FIG. 6(e) illustrates a reflected signal from tunable isoload ISO10. As previously discussed in FIG. 6(b), hybrid HYB12 sends a signal 2*xTX90 towards phase shifter PS6. Phase shifter PS6 shifts this signal 90 degrees as it passes towards tunable isoload ISO10 (signal 2*x*TX180, not shown) towards tunable isoload ISO10. Tunable isoload ISO10 has a reflection coefficient of Γiso, such that the reflected signal is Γiso*2*x*TX180 (not shown). This reflected signal passes back through phase shifter PS6, is shifted an additional 90 degrees, resulting in Γiso*2*x*TX270 (not shown), which is equivalent to −Γiso*2*x*TX90 as shown.

−Γiso*2*x*TX90 enters the upper right part of hybrid HYB12. A portion is directed left (without additional shifting) towards tunable filter TF8 as −Γiso*x*TX90. Another portion is directed downwards and to the left (with an additional 90 degrees of shifting) towards tunable filter TF10 as −Γiso*x*TX180.

FIG. 6(f). FIG. 6(f) continues tracking the signals from FIG. 6(e). Tunable filter TF8 receives −Γiso*x*TX90 (not shown) and reflects −Γiso*x*(1-x)*TX90 towards the upper left of hybrid HYB12. Hybrid HYB12 receives this signal, phase shifts it 90 degrees, and outputs it at port 3 Port3 as −Γiso*x*(1-x)*TX180.

Further, tunable filter TF10 receives −Γiso*x*TX180 (not shown) and reflects −Γiso*x*(1-x)*TX180 towards the lower right of hybrid HYB12. Hybrid HYB12 receives this signal, does not shift it, and then outputs it at port 3 Port3 as −Γiso*x*(1-x)*TX180.

FIG. 6(g). FIG. 6(g) simultaneously illustrates all of the signals from FIGS. 6(a) through 6(f) discussed above. Six signals are outputted at port 3 Port3 as RXOUT. The first two (x*TX0 and x*TX180) cancel as previously discussed. The next four signals cancel only if and when ΓL (the reflection coefficient of the antenna ANT) equals Γiso (the reflection coefficient of the tunable isoload ISO10.

Expressed as an equation: ΓL=Γiso causes cancellation of all of the reflected signals at port 3.

As discussed above, the reflection coefficient ΓL of the antenna ANT may vary as VSWR varies. If the reflection coefficient Γiso of the tunable isoload ISO10 is variable, then the reflective coefficient Γiso may be varied such that it is equal to the reflective coefficient ΓL of the antenna. In this case, at port 3, all of the signals shown in FIG. 6(g) will cancel.

As discussed in detail above, the 90 degree phase shift on the isolation port and the matching of the impedance on the isolation port relative to the antenna port causes the reflected TX signals at any frequency (i.e. at TX and RX frequencies) to cancel at the RXout, thus maintaining a good isolation of the tunable duplexer under mismatched antenna conditions.

One major benefit of this embodiment is that the tunable network can be located at the isolation port, thus it will not see the TX large signal power because the isolation port is already isolated from the TX signal by at least 10-20 dB due to the intra-band filter. Thus, the tuner at the isolation port can be a lossy tuner and/or can be a small size tuner because it is not required to handle large signal power (unlike a tuner at the antenna port).

If a tuner already exists on the antenna port, then the antenna port tuner would provide a coarse tuning (e.g. retune from 10:1 to 2:1 resolution) and the tuner on the isolation port would provide a fine tuning (e.g. tune from 2:1 to 1.05:1 resolution) to get the target TX-RX isolation of the duplexer.

FIG. 7. FIG. 7 illustrates only the outputs signals at RXOUT at Port3 for the circuit of FIG. 6(a). As discussed above, ΓL=Γiso causes cancellation of all of the reflected signals at Port3.

FIG. 8. FIG. 8 illustrates the results of a simulation of a dual hybrid based on a fisher hybrid network with VSWR1:1 (indicating that the antenna is matched). The TX reflective filter is a shunt filter that has a series resonance at TX frequency and parallel resonance at RX frequency. The TX and RX frequencies correspond to band2 duplexer settings (the TX is set to 1850 MHz and the RX is set to 1930 MHz). The Q settings are around 60.

In the case of VSWR1:1, the isolation at TX frequency is about −1.5 dB (see m3) and at RX frequency is about −1.6 dB (m4), while the isolation TX-RX is about −44 to −49 dB at TX (m5) and RX (m6) frequency respectively.

Thus, the curve with m3 is the transmit frequency curve. The curve with m4 is the receive frequency curve. The curve with m5 and m6 is the isolation curve indicting isolation between TX and RX. Thus, m5 indicates that that the transmit frequency at the receive port (Port3) is lowered by 44 dB.

FIG. 9. FIG. 9 illustrates the results of a simulation of a dual hybrid based on a fisher hybrid network with VSWR of 4:1 at the antenna port (indicating that the antenna is not matched), and the isolation port is not tuned. In this case, the isolation at TX frequency is about −3.4 dB at m3 and at RX frequency is about −3.5 dB at m4, while the isolation TX-RX is about −21.8 dB at TX (m5) and −21.4 dB at RX (m6). Thus, if the antenna is not matched, and the isolation port is not tuned, the isolation has degraded from −44 dB to −21 dB.

FIG. 10. FIG. 10 illustrates the results of a simulation of a dual hybrid based on a fisher hybrid network with VSWR of 4:1 at the antenna port (indicating that the antenna is not matched), and the isolation port is tuned. In this case, the isolation at TX frequency is about −3.4 dB (m3) and at RX frequency is about −3.5 dB (m4), while the isolation TX is about −42 dB at TX (m5) and RX is about −51 dB (m6). In FIG. 10, the isolation port is tuned to match the antenna port impedance, and the isolation has improved to 42 dB at TX and 51 dB at RX.

FIG. 11. FIG. 11 illustrates the results of a simulation with VSWR 4:1, Q=60, with tuning on the isolation port of 4:1, and 0 degrees phase shift at the isolation port (instead of the desired 90 degrees phase shift from FIG. 6(a)). The isolation is degraded relative to a 90 degree phase shift.

Some conventional duplexers use tuning at the isolation port (not shown). However, conventional duplexers do not use phase shifters.

In the embodiment of FIG. 6(a), the phase shift may be −90 degrees and generate similar cancellation. In practice, the phase shift may be within 10 degrees of 90 degrees (from 80 degrees to 100 degrees) or within ten degrees of −90 degrees (from −100 degrees to −80 degrees) to generate substantial cancellation of undesired signals.

Further, fast tuning of the isolation port (relative to changes in the antenna load changes, or relative to an antenna port mismatch algorithm) is preferable. This fast tuning may be performed by a control portion located on the duplexer, or by a separately located control portion that is in communication with the duplexer.

FIG. 12. FIG. 12 illustrates isolation and VSWR 1:1 with a quality factor Q of 80. The isolation at TX frequency is about −1 dB (m3) and at RX frequency is about −1 dB (m4), while the isolation TX is about −46 dB at TX (m5) and RX is about −49 dB (m6).

FIG. 13. FIG. 13 illustrates isolation for VSWR 1:1 with quality Q=90 at the upper edge of band 2 frequencies. The isolation at TX frequency is about −1.2 dB (m3) and at RX frequency is about −1.2 dB (m4), while the isolation TX-RX is about −46 dB at TX (m5) and −44 dB at RX (m6).

FIG. 14A. FIG. 14A illustrates placing a phase shifter at the antenna port of the duplexer, using high Γ RX intra-filters. FIG. 14A is similar to FIG. 4, except that the phase shifter PS8 is now located between hybrid HYB4 and antenna impedance tuner AIT2.

FIG. 14B. FIG. 14B illustrates placing a phase shifter at the antenna port of the duplexer, using high Γ TX intra-filters. FIG. 14B is similar to FIG. 5, except that the phase shifter PS10 is now located between hybrid HYB8 and antenna impedance tuner AIT4.

FIG. 15. FIG. 15 illustrates isolation for VSWR 4:1 (0=90), at the upper edge of band2 frequencies, with a 90 degree phase shifter on the antenna port.

The isolation at TX frequency is about −3/1 dB (see m3) and at RX frequency is about −3.2 dB (m4), while the isolation TX-RX is about −45 dB at TX (m5) and −47 dB at RX (m6). Similar results can be obtained by placing a 90 degree phase shifter on the isolation port.

In general, a first phase shifter may be placed on the isolation port and a second phase shifter may be placed on the antenna port such that the difference between the two phase shifters is 90 degrees or −90 degrees. Substantial cancellation occurs when the difference is between 80 degrees and 100 degrees, or between −100 degrees and −80 degrees. See FIGS. 16A and 16B below.

FIG. 16A. FIG. 16A illustrates using two phase shifters having a difference of 90 degrees, with intra-filters having high Γ RX. FIG. 16A is similar to FIG. 14A, except that the shifting function has been distributed over two locations.

The first phase shifter is in a first location between hybrid HYB4 and antenna impedance tuner AIT2, and shifts 45 degrees. The second phase shifter is in a second location between hybrid HYB2 and tunable isoload ISO6, and shifts −45 degrees.

FIG. 16B. FIG. 16B illustrates using two phase shifters having a difference of 90 degrees, with intra-filters having high Γ TX. FIG. 16B is similar to FIG. 14B, except that the shifting function has been distributed over two locations.

The first phase shifter is in a first location between hybrid HYB4 and antenna impedance tuner AIT2, and shifts 45 degrees. The second phase shifter is in a second location between hybrid HYB2 and tunable isoload ISO6, and shifts −45 degrees. FIGS. 16A and 16B are the most general embodiment, wherein the phase shifting may be performed at two distinct locations.

Those skilled in the art will recognize improvements and modifications to the preferred embodiments of the present disclosure. All such improvements and modifications are considered within the scope of the concepts disclosed herein and the claims that follow.

What is claimed is:

1. Duplexer circuitry comprising:
   a first hybrid coupler;
   a second hybrid coupler;
   a first filter with high reflectivity (Γ) at receiving frequencies (RX) and with low reflectivity (Γ) at transmitting frequencies (TX), and configured to filter signals between the first hybrid coupler and the second hybrid coupler;
   a second filter with high reflectivity (Γ) at receiving frequencies (RX) and with low reflectivity (Γ) at transmitting frequencies (TX), and configured to filter additional signals between the first hybrid coupler and the second hybrid coupler; and
   a phase shifter configured to shift a phase of signals passing between an isolation port of the first hybrid coupler and a tunable load.

2. The duplexer circuitry of claim 1, further comprising:
   the tunable load configured to communicate with the isolation port of the first hybrid coupler.

3. The duplexer circuitry of claim 1, further comprising:
   a tunable receiving frequency filter configured to communicate with a receiving frequency port of the second hybrid.

4. The duplexer circuitry of claim 1, wherein the phase shifter is configured to shift the phase by between 80 to 100 degrees, or by between −100 to −80 degrees.

5. Duplexer circuitry comprising:
   a first hybrid coupler;
   a second hybrid coupler;
   a first filter with high reflectivity (high Γ) at transmitting frequencies (TX) and with low reflectivity (low Γ) at receiving frequencies (RX), and configured to filter signals between the first hybrid coupler and the second hybrid coupler;

a second filter with high reflectivity (high Γ) at transmitting frequencies (TX) and with low reflectivity (low Γ) at receiving frequencies (RX), and configured to filter additional signals between the first hybrid coupler and the second hybrid coupler;

a phase shifter configured to shift a phase of signals passing between an antenna port of the second hybrid coupler and an antenna; and an antenna impedance tuner configured to tune an impedance of the antenna and located between the phase shifter and the antenna.

6. The duplexer circuitry of claim 5, further comprising:
a tunable load configured to communicate with an isolation port of the first hybrid coupler.

7. The duplexer circuitry of claim 5, further comprising:
a tunable receiving frequency filter configured to communicate with a receiving frequency port of the first hybrid.

8. The duplexer circuitry of claim 5, wherein the phase shifter is configured to shift the phase by one of approximately 90 degrees and approximately −90 degrees.

9. Duplexer circuitry comprising:
a first hybrid coupler;
a second hybrid coupler;
a first filter with high reflectivity (high Γ) at receiving frequencies (RX) and with low reflectivity (low Γ) at transmitting frequencies (TX), and configured to filter signals between the first hybrid coupler and the second hybrid coupler;
a second filter with high reflectivity (high Γ) at receiving frequencies (RX) and with low reflectivity (low Γ) at transmitting frequencies (TX), and configured to filter additional signals between the first hybrid coupler and the second hybrid coupler;
a first phase shifter configured to pass, and to shift by approximately a first value, signals passing between an isolation port of the first hybrid coupler and a tunable load; and
a second phase shifter configured to pass, and to shift by approximately a second value, signals passing between an antenna port of the second hybrid coupler and an antenna.

10. The duplexer circuitry of claim 9, wherein a difference between the first value and the second value is one of approximately 90 degrees and approximately −90 degrees.

11. The duplexer circuitry of claim 9, wherein a difference between the first value and the second value is between 80 to 100 degrees, or is between −100 to −80 degrees.

12. The duplexer circuitry of claim 9, further comprising the tunable load.

13. The duplexer circuitry of claim 9, further comprising a tunable receiving filter in communication with a receiving node of the second hybrid coupler.

14. The duplexer circuitry of claim 9, further comprising an antenna impedance tuner configured to pass signals between the second phase shifter and the antenna.

15. Duplexer circuitry comprising:
a first hybrid coupler;
a second hybrid coupler;
a first filter with high reflectivity (high Γ) at transmitting frequencies (TX) and with low reflectivity (low Γ) at receiving frequencies (RX), and configured to filter signals between the first hybrid coupler and the second hybrid coupler;

a second filter with high reflectivity (high Γ) at transmitting frequencies (TX) and with low reflectivity (low Γ) at receiving frequencies (RX), and configured to filter additional signals between the first hybrid coupler and the second hybrid coupler;
a first phase shifter configured to receive, and to shift by approximately a first value, signals passing between an isolation port of the first hybrid coupler and a tunable load; and
a second phase shifter configured to pass, and to shift by approximately a second value, signals passing between an antenna port of the second hybrid coupler and an antenna.

16. The duplexer circuitry of claim 15, wherein a difference between the first value and the second value is approximately 90 degrees or is approximately −90 degrees.

17. The duplexer circuitry of claim 15, wherein a difference between the first value and the second value is between 80 to 100 degrees, or between −100 to −80 degrees.

18. The duplexer circuitry of claim 15, further comprising the tunable load.

19. The duplexer circuitry of claim 15, further comprising a tunable receiving filter in communication with a receiving node of the first hybrid coupler.

20. The duplexer circuitry of claim 15, further comprising an antenna impedance tuner configured to pass signals between the second phase shifter and the antenna.

21. Duplexer circuitry comprising:
a first hybrid coupler;
a second hybrid coupler;
a first filter with high reflectivity (Γ) at transmitting frequencies (TX) and with low reflectivity (Γ) at receiving frequencies (RX), and configured to filter signals between the first hybrid coupler and the second hybrid coupler;
a second filter with high reflectivity (Γ) at transmitting frequencies (TX) and with low reflectivity (Γ) at receiving frequencies (RX), and configured to filter additional signals between the first hybrid coupler and the second hybrid coupler; and
a phase shifter configured to shift a phase of signals passing between an isolation port of the first hybrid coupler and a tunable load.

22. Duplexer circuitry comprising:
a first hybrid coupler;
a second hybrid coupler;
a first filter with high reflectivity (high Γ) at receiving frequencies (RX) and with low reflectivity (low Γ) at transmitting frequencies (TX), and configured to filter signals between the first hybrid coupler and the second hybrid coupler;
a second filter with high reflectivity (high Γ) at receiving frequencies (RX) and with low reflectivity (low Γ) at transmitting frequencies (TX), and configured to filter additional signals between the first hybrid coupler and the second hybrid coupler;
a phase shifter configured to shift a phase of signals passing between an antenna port of the second hybrid coupler and an antenna; and
an antenna impedance tuner configured to tune an impedance of the antenna and located between the phase shifter and the antenna.

* * * * *